(12) United States Patent
Sekiguchi et al.

(10) Patent No.: US 7,737,677 B2
(45) Date of Patent: Jun. 15, 2010

(54) WIDE AREA PROTECTION CONTROL MEASUREMENT SYSTEM AND METHOD

(75) Inventors: Katsuhiko Sekiguchi, Tama (JP); Hideyuki Takani, Kawagoe (JP); Hideaki Sugiura, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 12/203,685

(22) Filed: Sep. 3, 2008

(65) Prior Publication Data

US 2010/0007333 A1 Jan. 14, 2010

(30) Foreign Application Priority Data

Sep. 5, 2007 (JP) ............................. 2007-230681

(51) Int. Cl.
*G01R 13/04* (2006.01)
(52) U.S. Cl. ........................................ 324/113; 702/64
(58) Field of Classification Search ................. 324/113, 324/100; 702/64
See application file for complete search history.

(56) References Cited

U.S. PATENT DOCUMENTS

| | | | | |
|---|---|---|---|---|
| 6,360,177 | B1 * | 3/2002 | Curt et al. | 702/64 |
| 6,545,482 | B1 * | 4/2003 | Fedirchuk et al. | 324/522 |
| 6,950,764 | B2 * | 9/2005 | Ennis et al. | 702/60 |
| 7,209,804 | B2 * | 4/2007 | Curt et al. | 700/286 |
| 2006/0247874 | A1 | 11/2006 | Premerlani et al. | |
| 2007/0206644 | A1 | 9/2007 | Bertsch et al. | |

FOREIGN PATENT DOCUMENTS

| | | |
|---|---|---|
| JP | 2001-45645 | 2/2001 |
| JP | 2004-64974 | 2/2004 |

* cited by examiner

*Primary Examiner*—Ha Tran T Nguyen
*Assistant Examiner*—Arleen M Vazquez
(74) *Attorney, Agent, or Firm*—Finnegan, Henderson, Farabow, Garrett & Dunner, L.L.P.

(57) ABSTRACT

The present invention provides a wide area protection control measurement system and method which excels in economy, reliability and expandability, in which applied arithmetic operation functions for protection, control and measurement can be freely added and changed, without adding or changing power monitoring terminals to be installed in the electric-supply station. The wide area protection control measurement system is configured from N number of power monitoring terminals 1 installed in an electric-supply station in a target range, one electric quantity aggregation device 3 connected with these power monitoring terminals 1 via a communication network 2, and M number of applied arithmetic operation devices 4 connected with the electric aggregation device 3 through an inter-device connection. Each power monitoring terminal 1 transmits electric quantity data to the electric quantity aggregation device 3 via the communication network 2. The electric quantity aggregation device 3 aggregates received electric quantity data to generate aggregated electric quantity data and outputs it to each applied arithmetic operation devices 4. Each applied arithmetic operation devices 4 performs applied arithmetic operation for protection, control or management, using the aggregated electric quantity data acquired from the electric quantity aggregation device 3.

13 Claims, 17 Drawing Sheets

FIG. 3
(a)
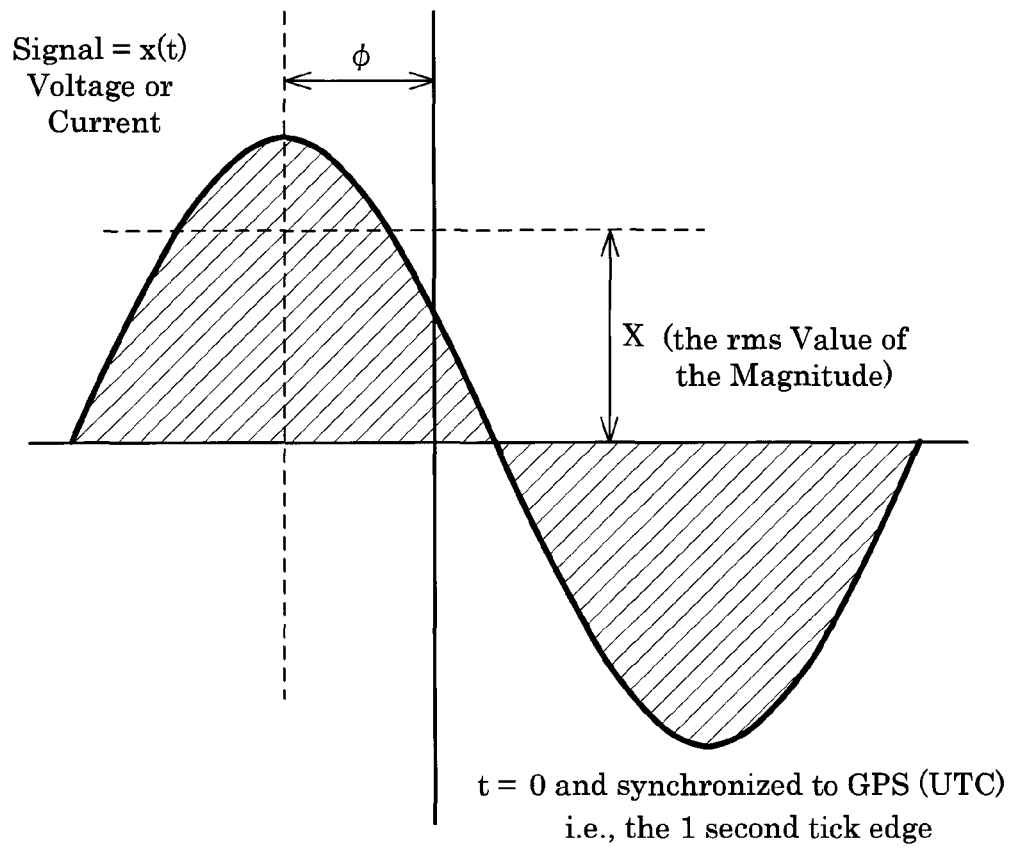
(b)
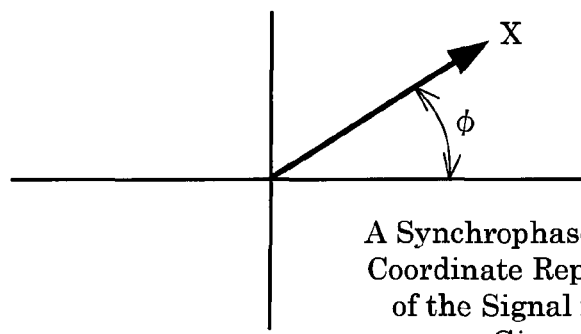
A Synchrophasor is a Polar
Coordinate Representation
of the Signal x(t) and is
Given as:
$X = X_{real} + jX_{imaginary}$

WIDE AREA PROTECTION CONTROL MEASUREMENT SYSTEM AND METHOD

BACKGROUND OF THE INVENTION

1. Field of the Invention

The present invention relates to a wide area protection control measurement system and method for performing protection, control and measurement of an electric power system.

2. Description of the Related Art

In order to stably supply electric power in the power transmission and distribution field, it is indispensable to perform protection, control and measurement for an entire electric power system, including a plurality of electric-supply stations and various apparatus and equipment, targeting a wide area electric power system, and various technologies for this have been proposed.

For example, Japanese Patent Application Laid-Open NO. 2001-45645 discloses a wide area protection technology, where the voltage/current of an electric power system is received by each terminal device installed in a transformer station, the received information is transmitted to a central processing unit via a wide area data network, current differential operation is executed by the central processing unit using each current information of the operation target section, and the presence of an accident in the system is determined.

Japanese Patent Application Laid-Open No. 2004-64974 discloses a wide area protection technology where information required to protect each electric-supply station and power transmission line is collected to a common arithmetic operation device, so as to perform overall monitoring of accidents generated in each electric-supply station and power transmission line, and perform overall protection.

In the conventional wide area protection technologies disclosed in the above-mentioned Japanese Patent Application Laid-Open Nos. 2001-45645 and 2004-64974, a power monitoring terminal installed in each electric-supply station and an applied arithmetic operation device having a protective operation function installed at the control side are directly connected via a communication network. A concrete protective operation, executed by the applied arithmetic operation device at the control side, is an electric current differential operation for a wide area disclosed in Japanese Patent Application Laid-Open No. 2001-45645, and is an arithmetic operation called "overall protective operation" disclosed in Japanese Patent Application Laid-Open No. 2004-64974. In these prior arts, a single protective operation is respectively executed after the working of the wide area protection system is started by the single protection operation function embedded in the applied arithmetic operation device at the control side in advance, when the wide area protection system is constructed.

On the other hand, implementing protection, control and measurement of an electric power system in many aspects is expected by performing diversified applied arithmetic operation, including various protective operation, control operation and measurement operation using electric quantities measured for the electric power system in a wide range. As a concrete applied arithmetic operation to be added to the above-mentioned prior art, in order to implement such protection, control and measurement in many aspects, determination of an accident point when an accident occurs to a power transmission line, using voltage and current information at both ends of the power transmission line, or calculation of a line constant of a power transmission line, and step-out relay operation, are possible.

However, in Japanese Patent Application Laid-Open Nos. 2001-45645 and 2004-64974, only a single protective operation function, that is, a single applied arithmetic operation function, is assumed as the applied arithmetic operation function for protection, control and measurement that is embedded in the applied arithmetic operation device at the control side, as mentioned above, so a reconsideration of the entire wide area protection system is required in order to add new applied operation functions, and construct a wide area protection control measurement system which implements protection, control and measurement of an electric power system in many aspects. Here "reconsideration of the entire wide area protection system" means to reconsider (1) what kind of information is collected, and (2) how the transmission cycle of the electric quantity collection is determined, or the like, for each applied arithmetic operation function, and to change the configuration of the entire wide area protection system according to the reconsideration result, and to construct a wide area protection control measurement system.

The configuration of an entire wide area protection system like this is normally changed by changing the data transmission software of all the power monitoring terminals installed in each electric-supply station, and manufacturing new hardware of the applied arithmetic operation device in which the software, to implement the applied arithmetic operation function to be added, is embedded. This method for changing the data transmission software for all the power monitoring terminals, however, has problems in terms of economics, since cost increases in proportion to the number of power monitoring terminals.

In other words, in a wide area protection control measurement system, normally it is necessary to collect electric quantities by installing as many power monitoring terminals as possible in the entire electric power system, in order to advance the accuracy of the applied arithmetic operation, therefore the number of power monitoring terminals inevitably increases. If applied arithmetic operation functions need be added in this state, enormous modifications, including a change in the software of the transmission control unit, are required for all the power monitoring terminals, and existing applied arithmetic operation functions may require enormous modifications as well, according to the prior arts of Japanese Patent Application Laid-Open Nos. 2001-45645 and 2004-64974. Also when a new power monitoring terminal is installed, modifications to receive data from the new power monitoring terminal are required for the existing applied arithmetic operation device side as well.

As a method for implementing protection, control and measurement of an electric power system in many aspects while avoiding the reconsideration of the entire wide area protection system, it is possible to construct a wide area protection control measurement system by assuming all the applied arithmetic operation functions that can be implemented in an initial state of constructing the wide are protection system, and embedding a configuration to implement all the assumed functions into the system.

If this method is used, however, it is possible to generate a considerable amount of applied arithmetic operation functions which are embedded in the wide area protection control measurement system, but which are not used and wasted. As a result, this is easily expected to cause economic problems, that is, the ratio of the effective applied arithmetic operation functions which are actually used to the entire applied arithmetic operation functions that were embedded is low, while the initial cost when the wide area protection control measurement system is constructed increases remarkably in proportion to the number of electric-supply stations and the number of applied arithmetic operation functions respectively.

Another method for implementing the protection, control and measurement of an electric power system in many aspects while avoiding reconsideration of the entire wide area protection system is installing a configuration for a single applied arithmetic operation function, similar to those disclosed in Japanese Patent Application Laid-Open Nos. 2001-45645 and 2004-64974 for each applied arithmetic operation function to be added, in other words, separately manufacturing and installing each power monitoring terminal to be installed in each electric-supply station, and the applied arithmetic operation device at the control side for performing applied arithmetic operation. However, in this case, an individual hardware is required for each applied arithmetic operation function to be added, which increases cost in proportion to the number of electric-supply stations, causing economic problems.

The above-mentioned problems resulting from the addition of a new applied computer function are problems which are also generated when a existing applied arithmetic operation function is changed, such as the case of changing the algorithm of an applied arithmetic operation function or changing the type of electric quantity to be used for applied arithmetic operation.

SUMMARY OF THE INVENTION

The present invention is proposed to solve the above-mentioned problems of the prior art, and an object thereof is to provide a wide area protection control measurement system and method which excels in economy, reliability and expandability, in which applied arithmetic operation functions for protection, control and measurement can be freely added and changed, without adding or changing power monitoring terminals to be installed in the electric-supply station.

A wide area protection control measurement system of the present invention is a wide area protection control measurement system for performing protection, control and measurement of an electric power system within a target range, having: a plurality of power monitoring terminals installed in an electric-supply station in the target range; one or more electric quantity aggregation devices which are connected to the power monitoring terminals via a communication network; and one or more applied arithmetic operation devices which are connected with the electric quantity aggregation devices via inter-device connection, wherein the power monitoring terminal, electric quantity aggregation device and applied arithmetic operation device are configured as follows.

Each power monitoring terminal constituting the plurality of power monitoring terminals has a data generation means for generating electric quantity data which indicates information on electric quantity by acquiring the electric quantity of the electric power system, and a data transmission means for transmitting the generated electric quantity data via a communication network. Each electric quantity aggregation device constituting the one or more electric quantity aggregation devices has data transmission means for receiving electric quantity data which is transmitted from the one or more power monitoring terminals via the communication network, data aggregation means for aggregating the received electric quantity data and generating aggregated electric quantity data, and one or more interfaces for inter-device connection to output the generated aggregated electric quantity data. Each applied arithmetic operation device constituting the above-mentioned one or more applied arithmetic operation devices has an interface for inter-device connection to acquire the aggregated electric quantity data which is outputted from the electric quantity aggregation device, and applied arithmetic operation means for performing applied arithmetic operation for protection, control or measurement using the acquired aggregated electric quantity data.

A wide area protection control measurement method of the present invention is a method for implementing the characteristics of the above-mentioned system.

As described above, according to the present invention, electric quantity data from all the power monitoring terminals installed in the electric-supply station is received and aggregated by the electric quantity aggregation device so as to be converted into electric quantity data in a format that can be easily processed, and then sent to each applied arithmetic operation device.

In the present invention, data including all the information required for applied arithmetic operation is generated by the electric quantity aggregation device without installing a terminal for each applied arithmetic operation function in the electric-supply station, and sent to the applied arithmetic operation device side in a format that can be easily processed. Therefore adding and changing of an applied arithmetic operation function can be easily implemented without adding or changing terminals installed in the electric-supply station at all, merely by manufacturing an applied arithmetic operation device where this function is embedded, and connecting the device to the electric quantity aggregation device, or changing the software embedded in the existing applied arithmetic operation device.

The data acquisition source, from which an individual applied arithmetic operation device acquires electric quantity data, is only the electric quantity aggregation device which is connected via an inter-device connection, and it is unnecessary for the applied arithmetic operation device to receive data directly from the power monitoring terminal, so there is no need to consider a existing system configuration when a new applied arithmetic operation device is manufactured and changed, including software development. The electric quantity data from each power monitoring terminal is transmitted via a different transmission path on the communication network, so transmission delays are often different depending on the transmission path, but in the case of manufacturing or changing the applied arithmetic operation device according to the present invention, which receives data from an individual power monitoring terminal via the communication network, this transmission delay, depending on the difference of the transmission path, need not be considered at all.

Therefore, compared with the case of changing the software of all the terminals, reconsidering the entire system, or the case of installing a terminal for each applied arithmetic operation function in each electric-supply station, the present invention can be implement adding or changing an applied arithmetic operation function easily and with flexibility, at lower cost, so a system that excels in economy, reliability and expandability can be implemented.

Also as mentioned above, the data acquisition source from which the individual applied arithmetic operation device acquires the electric quantity data of the present invention is only the electric quantity aggregation device which is connected via an inter-device connection, so compared with the case of directly acquiring electric quantity data from the individual power monitoring terminal installed in each electric-supply station via a communication network, the data transmission configuration of the entire system can be simplified. This aspect is described herein below.

If an applied arithmetic operation unit which directly acquires the electric quantity data from the power monitoring terminal of the electric-supply station is used, unlike the present invention, this applied arithmetic operation device requires many data transmission means according to the number of all the power monitoring terminals at the data acquisition source since data is received via the communication network. In this case, the number of data transmission means in the entire system increases in proportion to the increase of the number of applied arithmetic operation devices, and the number of data transmission paths in the entire system also increases accordingly, therefore the data transmission configuration of the entire system becomes complicated.

On the other hand, in the case of the applied arithmetic operation device of the present invention, which acquires the aggregated electric quantity data from the electric quantity aggregation device, it is unnecessary to install many data transmission means to transmit data via a communication network, as a configuration for data acquisition in the applied arithmetic operation device, and it is sufficient to install only an interface for connecting one or two electric quantity aggregation devices at the data acquisition source via an inter-device connection. In the case of this invention, the number of data transmission means and the number of data transmission paths in the system do not increase, even if the number of applied arithmetic operation devices increases, and compared with the case of directly acquiring the electric quantity data from the power monitoring terminal, the data transmission configuration of the entire system can be simplified, which leads to an improvement in economy and reliability. The effect of simplification of the data transmission configuration of the entire system increases in proportion to the increase in the number of both the power monitoring terminals and applied arithmetic operation devices.

In accordance with the present invention, a wide area protection control measurement system and method can be provided, which can freely add or change the applied arithmetic operation functions for protection, control and measurement, and which excel in economy, reliability and expandability, without adding or changing the terminals installed in an electric-supply station.

BRIEF DESCRIPTION OF THE DRAWINGS

FIG. 3 are diagrams depicting a synchro-phasor quantity computation performed by each power monitoring terminal of the first embodiment;

FIG. 7A is a configuration example of a prior art, and FIG. 7B is a configuration example of the present invention;

DESCRIPTION OF THE PREFERRED EMBODIMENTS

Embodiments of the wide area protection control measurement system of the present invention will now be concretely described with reference to the drawings. In the present description, "electric power system" is a broad concept that includes power transmission/distribution lines and power station/transformer station, which constitute an electric power system, and various apparatus and equipment thereof. And "electric-supply station" is a broad concept that includes various electric facilities where the power monitoring terminals of a power station/transformer station or the like are installed.

First Embodiment

Outline of Configuration

Figure 1:
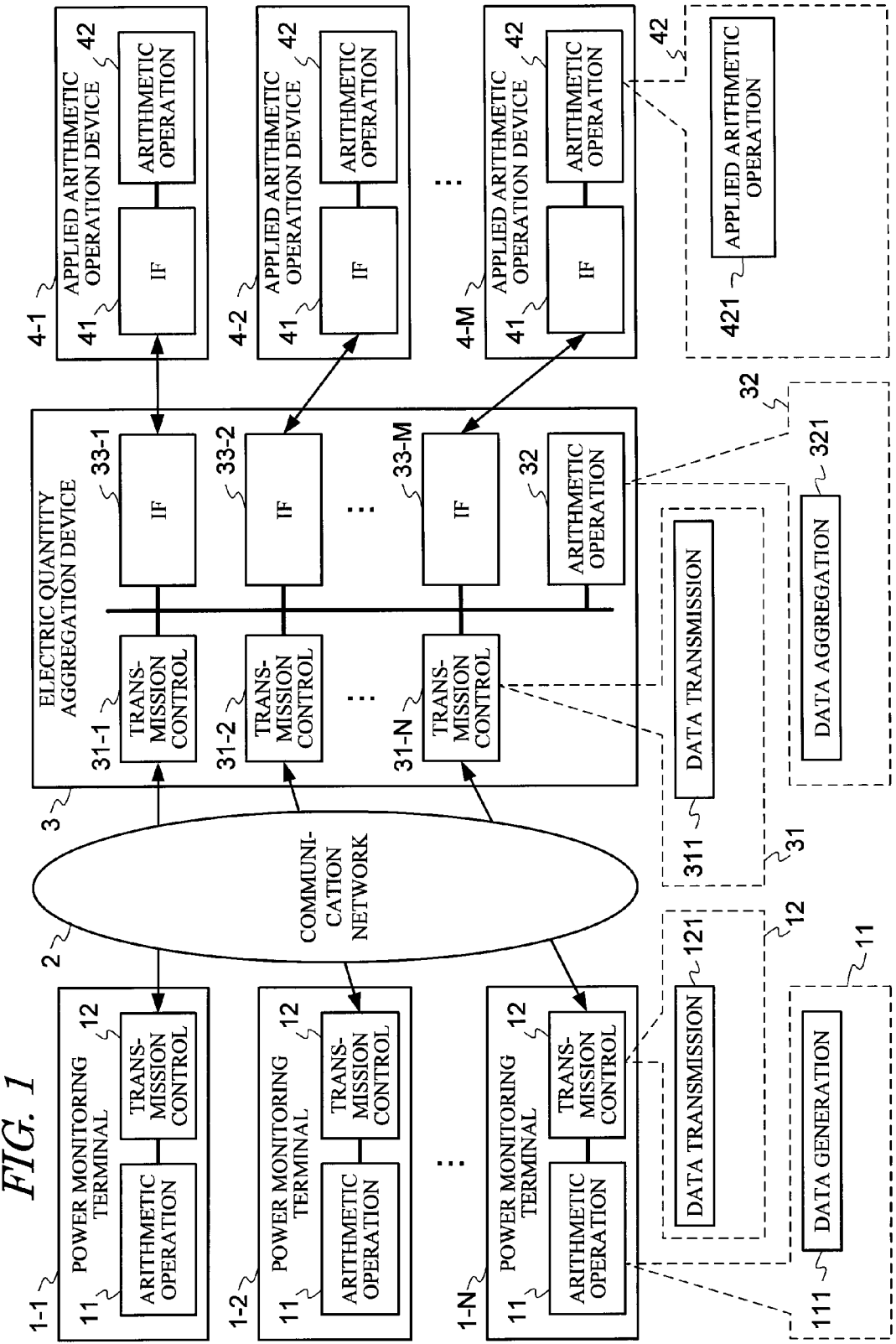
FIG. 1 is a block diagram depicting a main configuration of a wide area protection control measurement system according to a first embodiment to which the present invention is applied.

FIG. 1 is a block diagram depicting a main configuration of a wide area protection control measurement system according to a first embodiment to which the present invention is applied.

As FIG. 1 shows, the wide area protection control measurement system of the present embodiment is configured from N number of power monitoring terminals 1-1 to 1-N (N is an arbitrary integer in 2≦N) which are installed in an electric-supply station in a target range, one electric quantity aggregation device 3 which is connected with these power monitoring terminals 1-1 to 1-N via a communication network 2, and M number of applied arithmetic operation devices 4-1 to 4-M (M is an arbitrary integer in 1≦M) which are connected with the electric aggregation device 3 through an inter-device connection.

Each power monitoring terminal 1-1 to 1-N has an arithmetic operation unit 11 for implementing data generation means 111 to generate electric quantity data as voltage and current acquired from the electric power system, and a transmission control unit 12 for implementing data transmission means 121 to transmit the generated electric quantity data to the electric quantity aggregation device 3 via the communication network 2.

The electric quantity aggregation device 3 has N number of transmission control units 31-1 to 31-N for implementing data transmission means 311 to receive electric quantity data individually from the N number of power monitoring terminals 1-1 to 1-N, an arithmetic operation unit 32 for implementing data aggregation means 321 to generate aggregated electric quantity data by aggregating received electric quantity data, and M number of interfaces (IF) for inter-device connection 33-1 to 33-M to output the generated aggregated electric quantity data individually to the M number of applied arithmetic operation devices 4-1 to 4-M.

Each applied computer device 4-1 to 4-M has an interface (IF) for inter-device connection 41 to acquire the aggregated electric quantity data from the electric quantity aggregation device 3, and an arithmetic operation unit 42 for implementing applied arithmetic operation means 421 to perform applied arithmetic operation for protection, control or management, using the acquired aggregated electric quantity data.

Details on the power monitoring terminals 1-1 to 1-N, communication network 2, electric quantity aggregation device 3 and applied arithmetic operation devices 4-1 to 4-M, which constitute the wide area protection control measurement system of the present embodiment, will be described sequentially. The symbols following the hyphen in "power monitoring terminals 1-1 to 1-N" and "applied arithmetic operation devices 4-1 to 4-M" are used to simply specify an individual element, and in the following descriptions, "power monitoring terminal 1" and "applied arithmetic operation device 4" are used unless it is necessary to specify an individual element.

[Configuration of Power Monitoring Terminal]

Figure 2:
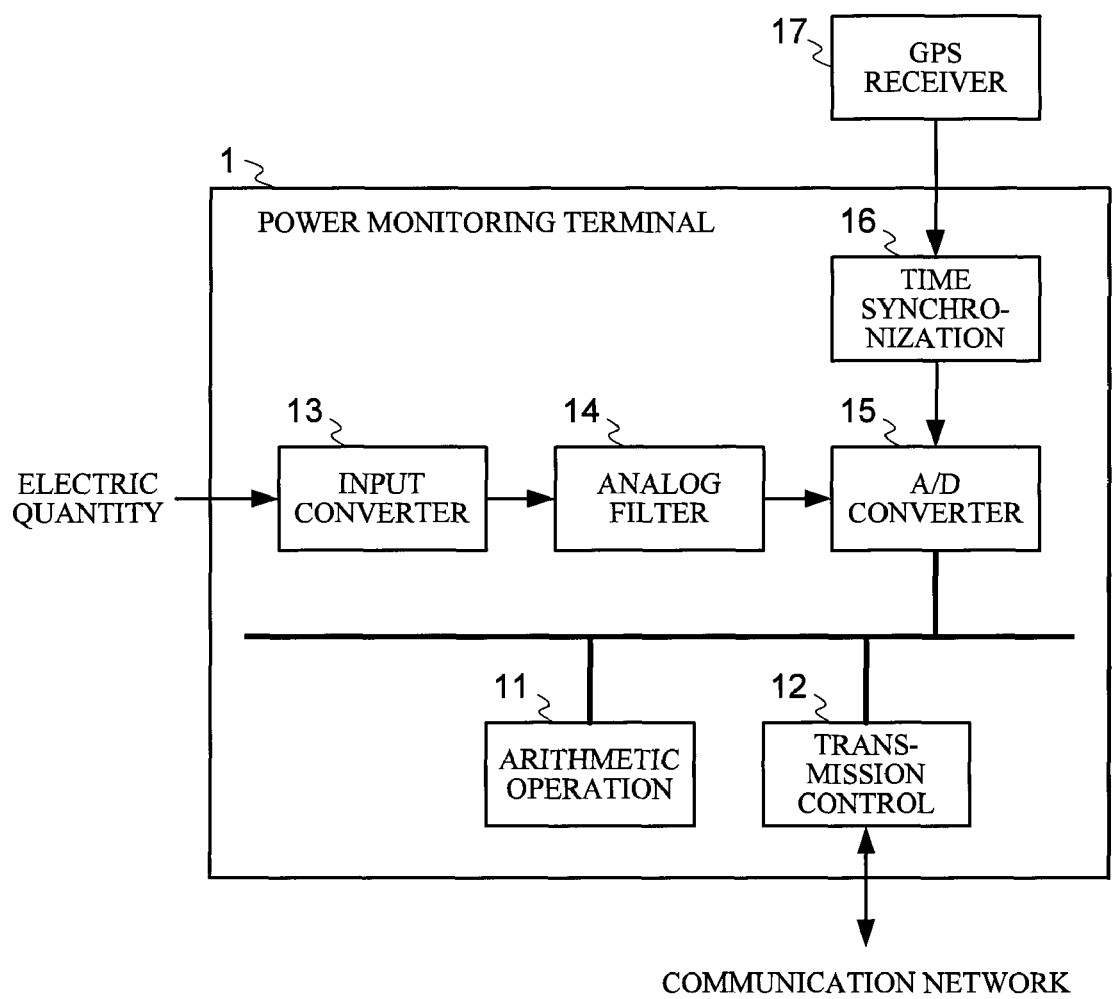
FIG. 2 is a diagram depicting an example of a hardware configuration of each power monitoring terminal according to the first embodiment.

FIG. 2 is a diagram depicting an example of a hardware configuration of each power monitoring terminal 1, and each power monitoring terminal 1 has an input converter 13, an analog filter 14, an analog/digital (A/D) converter 15, a time synchronization unit 16 and a GPS receiver 17, in addition to the arithmetic operation unit 11 and transmission control unit 12 shown in FIG. 1.

In this configuration, electric quantity, such as voltage and current, of the electric power system, is input to the input converter 13, and the input value is converted into a predetermined level of electric quantity. The analog filter 14 removes a predetermined frequency component from the output electric quantity of the input converter 13. The A/D converter 15 performs sampling and analog/digital conversion to convert the analog quantity into digital quantity.

The timing of sampling by the A/D converter 15 is a timing synchronizing UTC (coordinated universal time) received from a GPS (Global Positioning System) satellite, for example. This [timing generation] is implemented by generating a timing signal by the time synchronization unit 16 at a predetermined time using the time data received by the GPS receiver 17 and transferring this [timing signal] to the A/D converter 15.

The arithmetic operation unit 11 of each power monitoring terminal 1 is configured by a microprocessor, and a combination of this microprocessor and software for data generation implement data generation means 111 to determine the synchro-phasor quantity as electric quantity information.

The transmission control unit 12 of each power monitoring terminal 1 is configured by a communication control device, and a combination of this communication control device and software for data transmission implement data transmission means 121 to transmit and receive data to/from a corresponding transmission control unit 31 of the electric quantity aggregation device 3 via the communication network 2. In other words, in FIG. 1, each power monitoring terminal 1-1 to 1-N and the transmission control unit 12 thereof corresponds to each transmission control unit 31-1 to 31-N of the electric quantity aggregation device 2, and the transmission control unit 12 of each power monitoring terminal 1-1 to 1-N transmits and receives data to/from a corresponding transmission control unit 31-1 to 31-N (having a same symbol after a hyphen as this terminal) of the electric quantity aggregation device 2 via the communication network 2.

In the above-mentioned power monitoring terminal 1, the arithmetic operation unit 11, transmission control unit 12 and A/D converter 15, which handle digital data, are inter-connected via a bus, so that digital data can be exchanged among elements 11, 12 and 15.

[Configuration of Communication Network]

Possible concrete configurations of the communication network 2 shown in FIG. 1 are cable, optical fiber, radio LAN, microwave and power line carrier, for example. The use of a closed intranet within an electric company, or a VPN or general Internet which connects a plurality of companies, is also possible. It is also possible to combine a plurality of types of networks selected from these communication networks.

[Configuration of Electric Quantity Aggregation Device]

In the electric quantity aggregation device 3 shown in FIG. 1, each of the N number of transmission control units 31-1 to 31-N is configured by a communication control device, and a combination of this communication control device and software for data transmission implement data transmission means 311 to transmit and receive data to/from each of N number of power monitoring terminals 1-1 to 1-N via the communication network 2 respectively. Each transmission control unit 31-1 to 31-N corresponds to each power monitoring terminal 1-1 to 1-N and the transmission control unit 12 thereof respectively, and data is transmitted and received to/from the transmission control unit 12 of each corresponding power monitoring terminal 1-1 to 1-N (having a same symbol after the hyphen) via the communication network 2.

The arithmetic operation unit 32 of the electric quantity aggregation device 3 is configured by a microprocessor, and a combination of this microprocessor and software for data aggregation implement data aggregation means 321 to generate aggregated electric quantity data by aggregating the received electric quantity data. As mentioned above, the synchro-phasor quantity is determined in each power monitoring terminal 1 as electric quantity information, so concretely the data aggregation means 321 specifically performs processing to extract the synchro-phasor quantity at a same time in each frame of the electric quantity data, which is transmitted from a plurality of power monitoring terminals 1 respectively, and arrange [the synchro-phasor quantities] in a same frame.

Each interface (IF) 33-1 to 33-M of the electric quantity aggregation device 3 is configured by a connection device for inter-device connection, including a connection port and connection terminal. Each interface (IF) 33-1 to 33-M corresponds to each applied arithmetic operation device 4-1 to 4-M and the interface (IF) 41 thereof respectively, and [each interface (IF) 33-1 to 33-M] and interface (IF) 41 of each corresponding applied arithmetic operation device 4-1 to 4-M (having a same symbol after the hyphen) constitute an inter-device interface, and performs direct output/input of data between the devices.

In the above-mentioned electric quantity aggregation device 3, the transmission control unit 31, arithmetic operation unit 32 and interface (IF) 33, which handle digital data, are inter-connected via bus, so that digital data can be exchanged among these elements 31 to 33. The hardware of the electric quantity aggregation device 3 can be implemented by combining a high-speed large capacity microprocessor, a plurality of general communication control devices, and a plurality of general connection devices.

[Configuration of Applied Arithmetic Operation Device]

The interface (IF) 41 of each applied arithmetic operation device 4-1 to 4-M shown in FIG. 1 is configured by a connection device for inter-device connection, including a connection port and connection terminal. Each applied arithmetic operation device 4-1 to 4-M and interface (IF) 41 thereof correspond to each interface (IF) 33-1 to 33-M of the electric quantity aggregation device 3 respectively, and [each interface (IF) 41] and each corresponding interface (IF) 33-1 to 33-M (having a same symbol after the hyphen) of the electric quantity aggregation device 3 constitute an inter-device interface, and perform direct output/input of data between the devices.

The arithmetic operation unit 42 of each applied arithmetic operation device 4-1 to 4-M is configured by a microprocessor, and a combination of this microprocessor and software for applied arithmetic operation implement applied arithmetic operation means 421 to perform applied arithmetic operation for protection, for control or for measurement using the aggregated electric quantity data which was input. As mentioned above, according to the present embodiment, a synchro-phasor quantity is handled as an electric quantity information representation format, so the applied arithmetic operation means 42 performs applied arithmetic operation using the synchro-phasor quantity.

In the above-mentioned applied arithmetic operation device 4, the interface (IF) 41 and the arithmetic operation unit 42, which handle digital data, are connected via a bus, so that digital data can be exchanged among elements 41 and 42. The hardware of each applied arithmetic operation device 4-1 to 4-M can be implemented by a general server, including a microprocessor and a connection device.

[Actions]

Now actions of the wide area protection control management system of the first embodiment having the above configuration will be described.

[Action of Power Monitoring Terminal]

As mentioned above, in each power monitoring terminal 1-1 to 1-N, a timing signal is generated by the time synchronization unit 16 at a timing synchronizing with the UTC time data received by the GPS receiver 17 via a GPS satellite, whereby the A/D converter 15 samples and the A/D-converts the analog quantity at a same time, and synchronized digital electric quantity data is acquired. The synchronized digital electric quantity data is converted into a synchro-phasor quantity by the data generation means 111, as mentioned above, and is united with the same time into one frame as the electric quantity data at this time.

Data generation means 111 outputs magnitude X and phase ϕ as the synchro-phasor quantity, where the phase ϕ is an instantaneous phase angle on a cosine function with respect to a UTC (coordinated universal time) timing acquired by 1 PPS (Pulse Per Second) signal, which is outputted from the GPS receiver 17.

$$x(t) = \sqrt{2} X \cos(\omega t + \phi)$$

A phasor representation of the signal x(t) represented in the above expression is given by a complex quantity expressed by the following expression (1).

$$\begin{aligned} X &= X_{real} + jX_{imaginary} \\ &= X\varepsilon^{j\phi} \\ &= X(\cos\phi + j\sin\phi) \end{aligned} \quad (1)$$

FIG. 3 are diagrams describing the synchro-phasor computation which is performed by the data generation means 111. FIG. 3A shows the relationship of the synchro-phasor quantity (magnitude X and phase ϕ) and an actual AC waveform x(t). A point of the phase, which is shifted by ϕ from the vertex of the cosine waveform, is the timing at which a 1 PPS signal enters. The effective value of the AC waveform is the magnitude X. FIG. 3B is a polar coordinate representation of the magnitude X of the effective value of the AC waveform.

Using the synchro-phasor quantity as a representation format of the electric quantity information to indicate the electric quantity has the following advantages.

"Information can be easily understood, and the handling of the representation format is easy."

"The representation format can be used even for a low-speed transmission path."

"System construction in a wide area is easy since a special synchronization mechanism between devices is unnecessary."

As described above, in each power monitoring terminal 1-1 to 1-N, a frame of electric quantity data, including the synchro-phasor quantity at each sampling time acquired by the data generation means 111, is sent to the electric quantity aggregation device 3 by the data transmission means 121 via the communication network 2 after the sampling time, a transmission source ID to indicate this terminal at the transmission source and verification data for data check are attached.

[Action of Electric Quantity Aggregation Device]

In the electric quantity aggregation device 3, if each frame of the electric quantity data from each power monitoring terminal 1-1 to 1-N is received from each corresponding data transmission means 311 respectively, these data frames are aggregated by the data aggregation means 321, and one frame of the aggregated electric quantity data, including the electric quantity information of the N number of power monitoring terminals at this sampling time, is generated.

Each frame of the electric quantity data from each power monitoring terminal 1 includes the synchro-phasor quantity as the electric quantity information, so the data aggregation means 321 extracts the synchro-phasor quantity at a same sampling time from each frame of the received electric quantity data, and performs processing to arrange the synchro-phasor quantity in a same frame.

Figure 4:
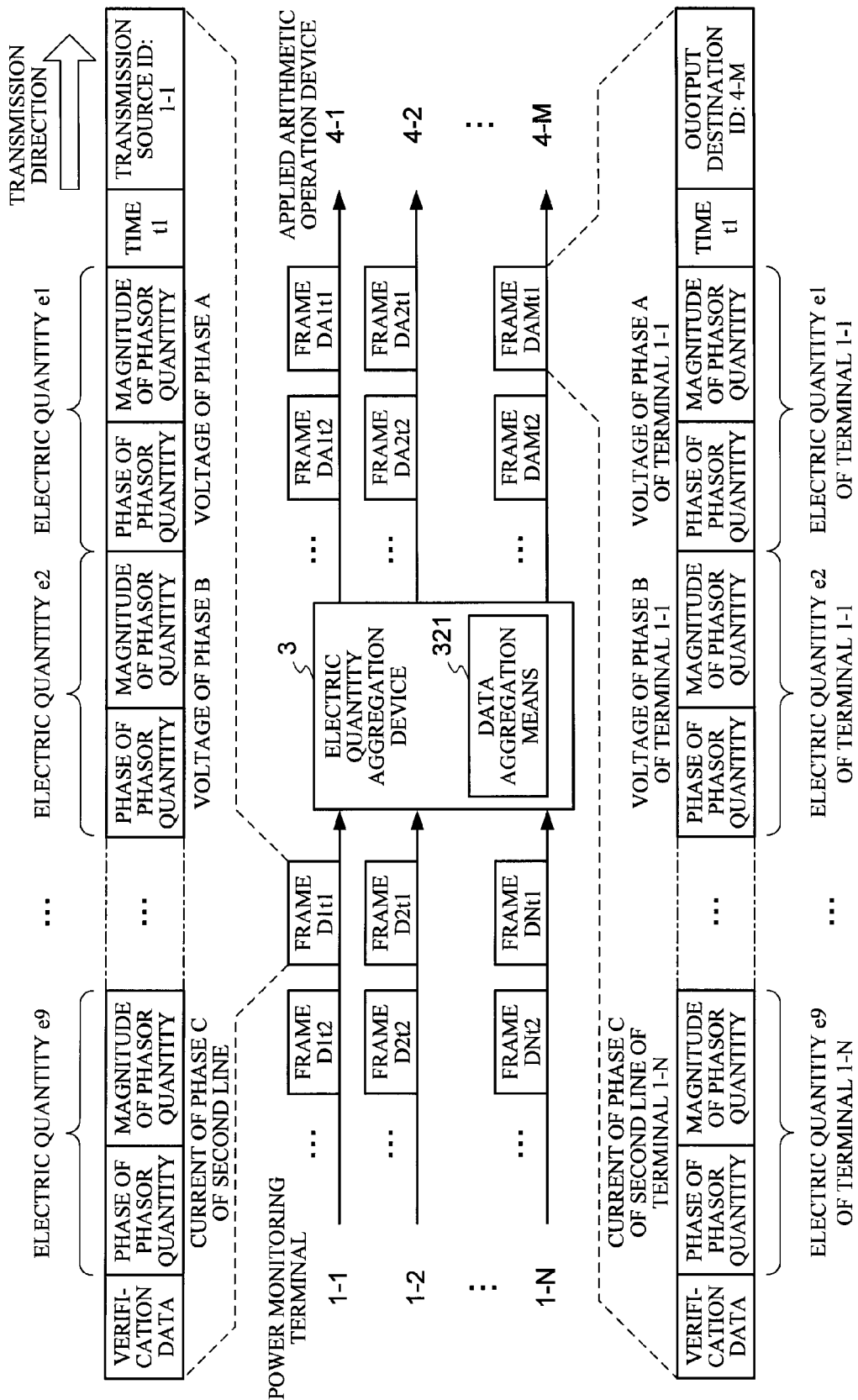
FIG. 4 is a diagram depicting a concrete processing example of electric quantity data by a power quantity aggregation device of the first embodiment.

FIG. 4 is a diagram depicting a concrete processing example of the electric quantity data by the electric quantity aggregation device 3, which shows a concrete frame configuration of the electric quantity data which the electric quantity aggregation device 3 receives from each power monitoring terminal 1, and a concrete frame configuration of the aggregated electric quantity data, which is generated by aggregating the electric quantity data having the above frame configuration by the electric quantity aggregation device 3, and transmitted to each applied arithmetic operation device.

The example in FIG. 4 shows the state where each power monitoring terminal 1 acquires three electric quantities, e1 to e3, which indicate the bus voltage of each of the three phases of a transformer station (electric quantity e1: voltage of phase a, electric quantity e2: voltage of phase b, and electric quantity e3: voltage of phase c), and six electric quantities e4 to e9 which indicate the power transmission line current of each of the three phases of two lines (electric quantity e4: current of phase a of the first line, electric quantity e5: current of phase b of the first line, electric quantity e6: current of phase c of the first line, electric quantity e7: current of phase a of the second line, electric quantity e8: current of phase b of the second line, and electric quantity e9: current of phase c of the second line), a total of nine electric quantities, and the magnitude and the phase of the voltage [or current] phasor quantity of these quantities e1 to e9 are transmitted periodically at every sampling time (t1, t2, . . . ).

In the example in FIG. 4, the phasor quantity to indicate information of the electric quantity, which was sampled and converted into digital at the s-th sampling time ts (s is an arbitrary integer in $1 \leq s$) in the n-th power monitoring terminal 1-$n$ (n is an arbitrary integer in $1 \leq n \leq N$), is sequentially arranged from the magnitude and the phase of the voltage phasor quantity of the electric quantity e1 to the voltage phasor quantity of the final electric quantity e9, and are aggregated into one frame, Dnts, as a synchro-phasor quantity at this timing ts of the power monitoring terminal 1-$n$.

In the beginning of the frame Dnts, a terminal number "1-$n$" to indicate the n-th power monitoring terminal (n is an arbitrary integer in $1 \leq n \leq N$) and a sampling time "ts" are attached as a transmission source ID to indicate each transmission source power monitoring terminal, and at the end of the frame Dnts, a verification data to perform data check using CRC (Cyclic Redundancy Check) or the like is attached. In FIG. 4, a configuration of the frame D1$t$1 of the electric quantity data, when the synchro-phasor quantity of the first power monitoring terminal 1-1 at time t1 is aggregated, is shown as an example, but the frame Dnts of the other electric quantity data also has the same configuration.

The sampling time, out of the above-mentioned attached information to be attached to the frame of the electric quantity data, is attached by the data generation means 111 when the synchro-phasor quantity is aggregated into one frame. After the synchro-phasor quantity is aggregated into one frame by the data generation means 111 of the power monitoring terminal 1, the transmission source ID and verification data are attached to this frame by the data generation means 111 or data transmission means 121 of the power monitoring terminal 1.

The electric quantity data from each power monitoring terminal 1, which is transmitted using the frame configuration shown in FIG. 4, is transmitted to the electric quantity aggregation device 3 via a different transmission path on the communication network, so the transmission delays are often difficult from each other. Therefore the timings when a plurality of frames, which were converted into digital data at a same timing in the plurality of power monitoring terminals 1, reach the electric quantity aggregation device 3, are not always the same.

If the sampling time ts (s is an arbitrary integer in $1 \leq s$) is attached in the frame, as shown in FIG. 4, on the other hand, the data aggregation means 321 of the electric quantity aggregation device 3 can extract the synchro-phasor quantity for N number of [power monitoring terminals 1] at a same timing ts from the receive frames sent from the N number of power monitoring terminals 1 easily and with certainty using the time in a frame. The data aggregation means 321 of the electric quantity aggregation device 3 arranges the extracted synchro-phasor quantities for N number of terminals at a same timing ts according to a predetermined condition, so as to reconfigure [the synchro-phasor quantities] as an aggregated electric quantity data frame DAts in a format suitable for the applied arithmetic operation of the applied arithmetic operation device 4, and outputs [the frame DAts] to each applied arithmetic operation device 4 via each interface 33.

In the example in FIG. 4, the synchro-phasor quantities for N number of terminals at a same timing ts are sequentially arranged for each terminal from the magnitude and phase of the voltage phasor quantity of each electric quantity e1 to e9 of the first power monitoring terminal 1-1 to the magnitude and phase of the voltage phasor quantity of each electric quantity e1 to e9 of the N-th power monitoring terminal 1-N, and are aggregated into one frame DAmts as a synchro-phasor quantity for the N number of terminals at this timing ts.

In the beginning of this frame DAmts, a device number "4-$m$" to indicate the m-th applied arithmetic operation device (m is an arbitrary integer in $1 \leq m \leq M$) and sampling time "ts" are attached as an output destination ID to indicate each applied arithmetic operation unit at the output destination, and after the last frame DAmts, a verification data to perform a data check using CRC (Cyclic Redundancy Check) or the like is attached. In FIG. 4, a configuration of a frame DAMt1 of the aggregated electric quantity data at the sampling time t1 to the M-th (m=M) applied arithmetic operation device 4-M as the output destination is shown as an example, but the frame DAmts of the other aggregated electric quantity data also have the same configuration.

The sampling time, out of the above-mentioned attached information to be attached to the frame of the aggregated electric quantity data, is attached by the data aggregation means 321 when the synchro-phasor quantities from a plurality of power monitoring terminals are aggregated into one frame. After the synchro-phasor quantities from a plurality of power monitoring terminals are aggregated into one frame by the data aggregation means 321 of the electric quantity aggregation device 3, the output destination ID and verification data are attached to this frame by the data aggregation means 321 of the electric quantity aggregation device 3 or each interface 33 corresponding to the applied arithmetic operation device 4 at the output destination.

[Action of Applied Arithmetic Operation Device]

When a frame of the aggregated electric quantity data is input from the electric quantity aggregation device 3 to each applied arithmetic operation device 4-1 to 4-M via the interface 41, the applied arithmetic operation means 421 performs applied arithmetic operation for protection, control or measurement using the input frame based on a predetermined arithmetic operation algorithm.

A concrete example of applied arithmetic operation will be described below, where each applied arithmetic operation device 4 receives a frame of aggregated electric quantity data from the electric quantity aggregation device 3, as synchrophasor quantities of N number of power monitoring terminals. Here, the frame of aggregated electric quantity data includes the magnitude and phase of the voltage phasor quantity, on each of the nine electric quantities, e1 to e9, as shown in FIG. 4 that depicts a processing example in relation to the electric quantity aggregation device 3, which indicate the bus voltage of each of the three phases of the transformer station and power transmission line current of each of the three phases of the two lines, respectively.

[Applied Arithmetic Operation Example Using Voltage Drop and Phase Difference]

When the applied arithmetic operation device 4 receives a frame of aggregated electric quantity data, including the magnitude and phase of voltage phasor quantities of the above-mentioned nine electric quantities e1 to e9, from the electric quantity aggregation device 3, the applied arithmetic operation for monitoring accident based on the voltage drop and phase difference can be performed as shown in the following expressions (2) and (3).

$$|\phi i - \phi j| < \phi k \qquad (2)$$

$$|Vi| < Vk, |Vj| < Vk \qquad (3)$$

Here, $\phi$ is a representative phase of each electric-supply station, and corresponds to the synchronous voltage phasor of the power monitoring terminal 1, for example. The synchronous voltage phasors from arbitrary power monitoring terminals I and J (where $I \geq 1$, $J \geq 1$ and $I \neq J$) are represented as $\phi i$ and $\phi j$ respectively.

If this applied arithmetic operation is performed in the first applied arithmetic operation device 4-1 shown in FIG. 1, for example, this applied arithmetic operation device 4-1 periodically monitors whether the voltage phase difference from each of the different power monitoring terminals is a predetermined value Ok or more, according to the above-mentioned expression (2). This corresponds to constantly monitoring the phase difference of the bus voltages of different transformer stations.

It is known that if an accident occurs in a power station, the phase of a bus voltage of a transformer station connected to the failed equipment or power transmission line changes. Therefore the presence of a system accident and location of the accident in the system can be specified by regularly monitoring the phase difference using the above expression (2). As a general procedure, if a certain degree of drop in the level of voltage is detected based on expression (3), expression (2) is calculated responding to the establishment of this voltage condition.

Figure 5:
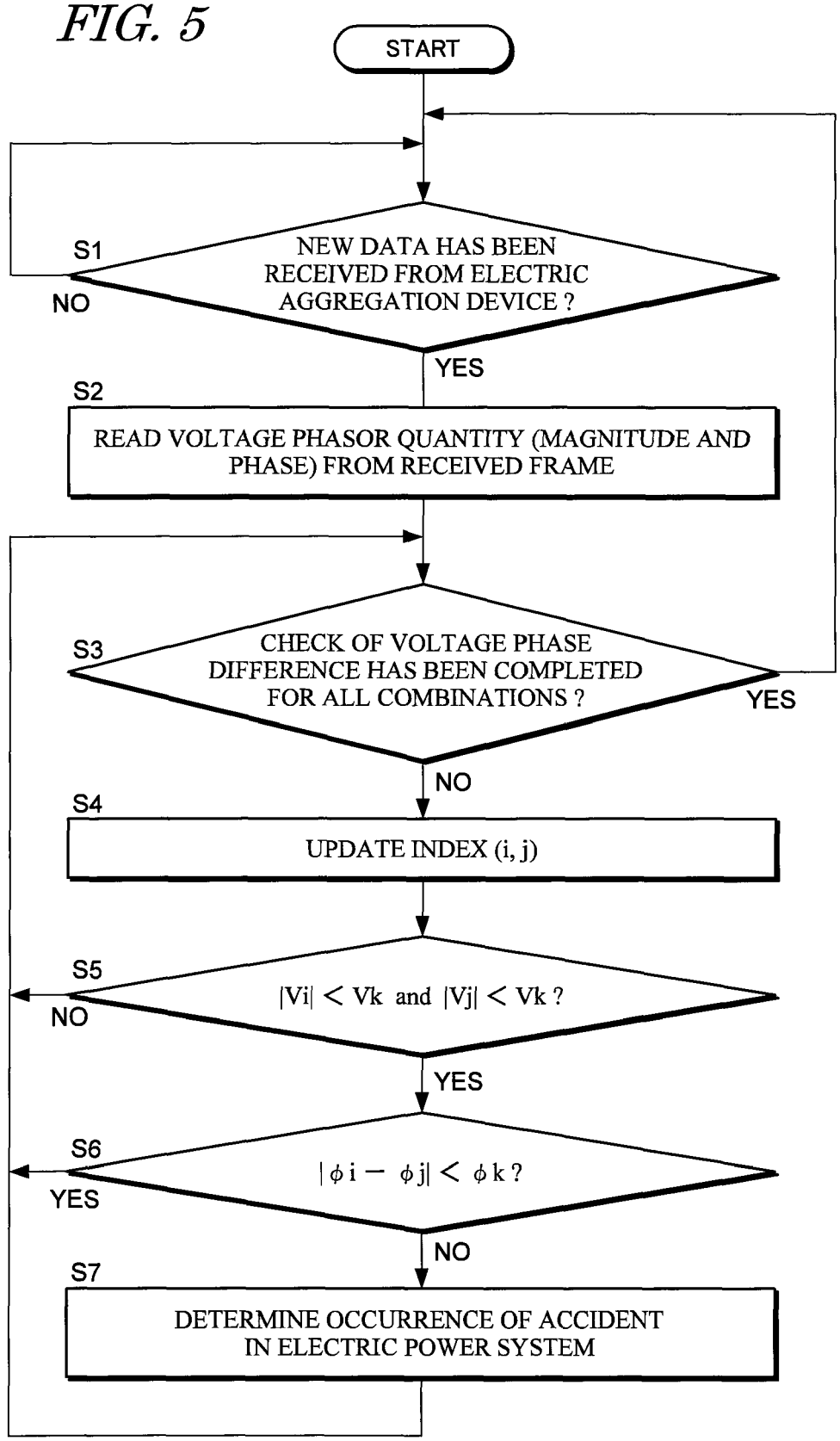
FIG. 5 is a flow chart depicting an example of a concrete arithmetic operation flow of the applied arithmetic operation device when an applied arithmetic operation for accident monitoring based on a voltage drop and phase difference according to the first embodiment is performed.

FIG. 5 is a flow chart depicting an example of a concrete arithmetic operation by the applied arithmetic operation means 421 of the applied arithmetic operation device 4-1 when this applied arithmetic operation is performed. In S1, the applied arithmetic operation means 421 checks if a frame of a new aggregated electric quantity data has been received, and if received (YES in S1), [the applied arithmetic operation means 421] reads a voltage phasor quantity from the received frame in S2. In order to monitor the phase difference from different power monitoring terminals, the index (i, j) of the power monitoring terminal is sequentially updated in S4. Expression (3) is calculated in S5, and expression (2) is calculated in S6, and if expression (2) is established (YES in S6), it is determined that an accident occurred in the electric power system in S7. Whether a check of phase difference of bus voltages for all combinations of terminals has been completed or not is confirmed in S3, and if completed (YES in S3), [processing] returns to S1, and arrival of new receive data is confirmed.

[Applied Arithmetic Operation Example Based on Frequency]

If the applied arithmetic operation device 4 receives a frame of aggregated electric quantity data, including the magnitude and phase of the voltage phasor quantity of the above-mentioned nine electric quantities, e1 to e9, from the electric quantity aggregation device 3, the frequency of each power monitoring terminal installation location in the electric power system can be determined by differentiating the phase $\phi$ of the voltage phasor by time, as shown in the following expressions (4) and (5).

$$2\pi \Delta f = \frac{d\phi}{dt} \qquad (4)$$

$$f(\text{Hz}) = 60 + \Delta f \qquad (5)$$

If this applied arithmetic operation is performed by the second applied arithmetic operation device 4-2 shown in FIG. 1, for example, the applied arithmetic operation means 421 of this applied arithmetic operation device 4-2 checks whether a frame of a new aggregated electric quantity data has been received from the electric quantity aggregation device 3, and if received, [the applied arithmetic operation means 421] reads a phase $\phi$ of the voltage phasor quantity from the received frame, and performs computation to extract frequency f using the above expressions (4) and (5).

Figure 6:
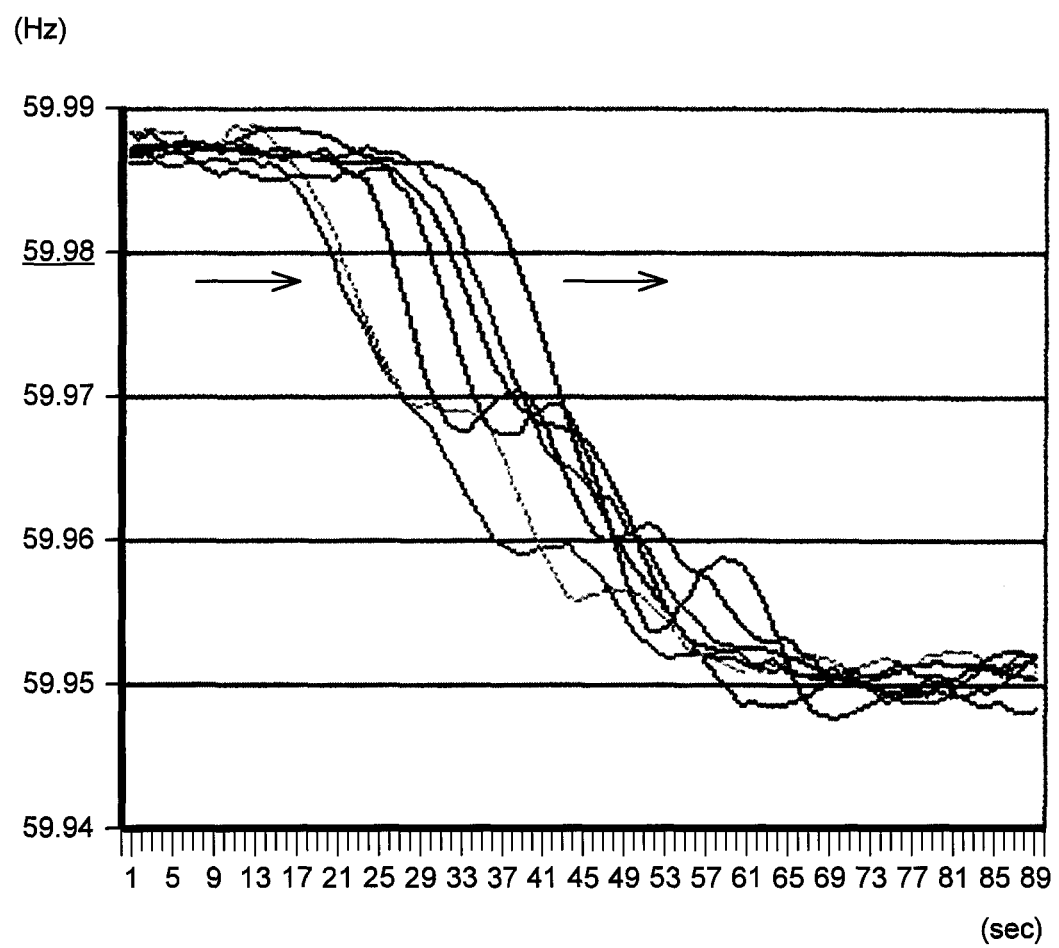
FIG. 6 is a graph showing an example of a time-based change of frequencies of a plurality of transformer stations when a generator failed due to an accident.

FIG. 6 is a graph showing an example of a time-based change of frequencies of a plurality of transformer stations when a generator failed due to an accident, and shows a time-based change of the frequencies of the transformer stations at seven locations respectively. In FIG. 6, the portion indicated by 59.98 Hz shows that the frequency changed to 59.98 Hz sequentially from a transformer station closer to the failed power station. This is a known qualitative phenomena.

Using this phenomena where the change of frequency propagates from the location of the system failure to the periphery, a problem generation location can be estimated from each power monitoring terminal installation location, which is a frequency observation point. Also a change of the generated energy can be estimated based on the time-based change rate of the frequency.

[Effects]

As described above, the wide area protection control measurement system of the first embodiment receives and aggregates the electric quantity data from all the power monitoring terminals 1-1 to 1-N installed in the electric-supply station by the electric quantity aggregation device 3, and converts [the aggregated receive data] into aggregated electric quantity data in a format that can be easily processed, then sends [the aggregated electric quantity data] to each applied arithmetic operation device 4-1 to 4-M. According to this wide area protection control measurement system of the first embodiment, the following effects can be implemented.

First, as mentioned above, the number of power monitoring terminals inevitably increases if the accuracy of the applied arithmetic operation is increased in the wide area protection control measurement system, but if an addition of an applied arithmetic operation function is needed in this state, enormous modification, including a change of software of the transmission control units in all the power monitoring terminals is required, and in some cases, enormous modification is also required to change the applied arithmetic operation functions, if the prior arts disclosed in Japanese Patent Application Laid-Open Nos. 2001-45645 and 2004-64974 are used. On the other hand, in the case of the wide area protection control measurement system of the present embodiment, modification required when an applied arithmetic operation function needs to be added entails only the interface between the electric quantity aggregation device and the new applied arithmetic operation device.

In other words, in the present embodiment, the data, including all the information required for the applied arithmetic operation, is generated by the electric quantity aggregation device, and is sent to the applied arithmetic operation device side as a format that can be easily processed, without installing a terminal for an individual applied arithmetic operation function in the electric-supply station. Therefore in the wide area protection control measurement system of the present embodiment, an applied arithmetic operation function can be added merely by manufacturing an applied arithmetic operation device having this function embedded, and modifying the interface with the electric quantity aggregation device so as to enable inter-device connection without adding or changing the power monitoring terminals installed in the electric-supply station, and an applied arithmetic operation function can be easily changed merely by changing the software embedded in the existing applied arithmetic operation device.

As mentioned above, according to the prior arts disclosed in Japanese Patent Application Laid-Open Nos. 2001-45645 and 2004-64974, when a new power monitoring terminal is installed, modification to acquire data from the new power monitoring terminal is required at the existing applied arithmetic operation device side. In the case of the present embodiment, on the other hand, where the data acquisition source of an individual applied arithmetic operation device is only an electric quantity aggregation device which is connected via an inter-device connection, the applied arithmetic operation device need not receive data from an individual power monitoring terminal via the communication network, so there is no need in any way to be concerned with the existing system configuration when a new applied arithmetic operation device is manufactured, including the software development, or when a existing applied arithmetic operation device is changed. In particular, when a new applied arithmetic operation function is developed and commercialized, according to the present embodiment, the applied arithmetic operation function can be developed and connected with the existing system with no concern at all for the existing system configuration, so a system that excels in terms of development efficiency of the applied arithmetic operation functions and economy can be constructed.

The power quantity data from each power monitoring terminal is transmitted via a different transmission path on the communication network, so transmission delays thereof are often different from each other, therefore when an applied arithmetic operation device, which receives data from an individual power monitoring terminal via the communication network according to a prior art, is manufactured or changed, transmission delays due to the difference of the transmission paths must be considered. Whereas when an applied arithmetic operation device according to the present embodiment, where data is not received from an individual power monitoring terminal via the communication network, is manufactured or changed, transmission delays due to the transmission paths can be ignored.

Therefore compared with a case of changing the software of all the terminals when reconsidering the entire system, or a case of installing a terminal for an individual applied arithmetic operation function in each electric-supply station, as in the case of the prior arts disclosed in Japanese Patent Application Laid-Open Nos. 2001-45645 and 2004-64974, an applied arithmetic operation function can be added and changed very easily with great flexibility in the case of the present embodiment, and cost can also be reduced considerably, so a system which excels in economy, reliability and expandability can be implemented.

As mentioned above, the data acquisition source from which the individual applied arithmetic operation device of the present invention acquires electric quantity data is only the electric quantity aggregation device which is connected via inter-device connection, so compared with the case of directly acquiring the electric quantity data from the individual power monitoring terminal installed in each electric-supply station via the communication network, the data transmission configuration of the entire system can be simplified. This aspect will now be described.

In the case of an applied arithmetic operation device which directly acquires the electric quantity data from the power monitoring terminal of the electric-supply station, just like the case of the prior arts disclosed in Japanese Patent Application Laid-Open Nos. 2001-45645 and 2004-64974, this applied arithmetic operation device needs many transmission control units so as to implement the many data transmission means according to the number of all the power monitoring terminals of the data acquisition source, in order to receive data via the communication network. In this case, the number of transmission control units of the entire system increases in proportion to the increase of the number of applied arithmetic operation devices, and the number of data transmission paths in the entire system also increases accordingly, and as a result, the data transmission configuration of the entire system becomes complicated.

Whereas in the case of the applied arithmetic operation device of the present embodiment, which acquires the aggregated electric quantity data from the electric quantity aggregation device, it is unnecessary to install many transmission control units to transfer data via the communication network, as the configuration to acquire data in the applied arithmetic operation device, and installing only one interface to connect with one electric quantity aggregation device at the data acquisition source via inter-device communication is sufficient. In the present embodiment, the numbers of the data transmission means and data transmission paths in the system do not increase, even if the number of applied arithmetic operation devices increases, and the data transmission configuration of the entire system can be simplified compared with the case of directly acquiring the electric quantity data from the power monitoring terminal, and this [simplified configuration] also leads to an improvement in economy and reliability. The effect of the simplification of the data transmission configuration in the entire system increases in proportion to the increase of both the power monitoring terminals and applied arithmetic operation devices.

Figure 7:
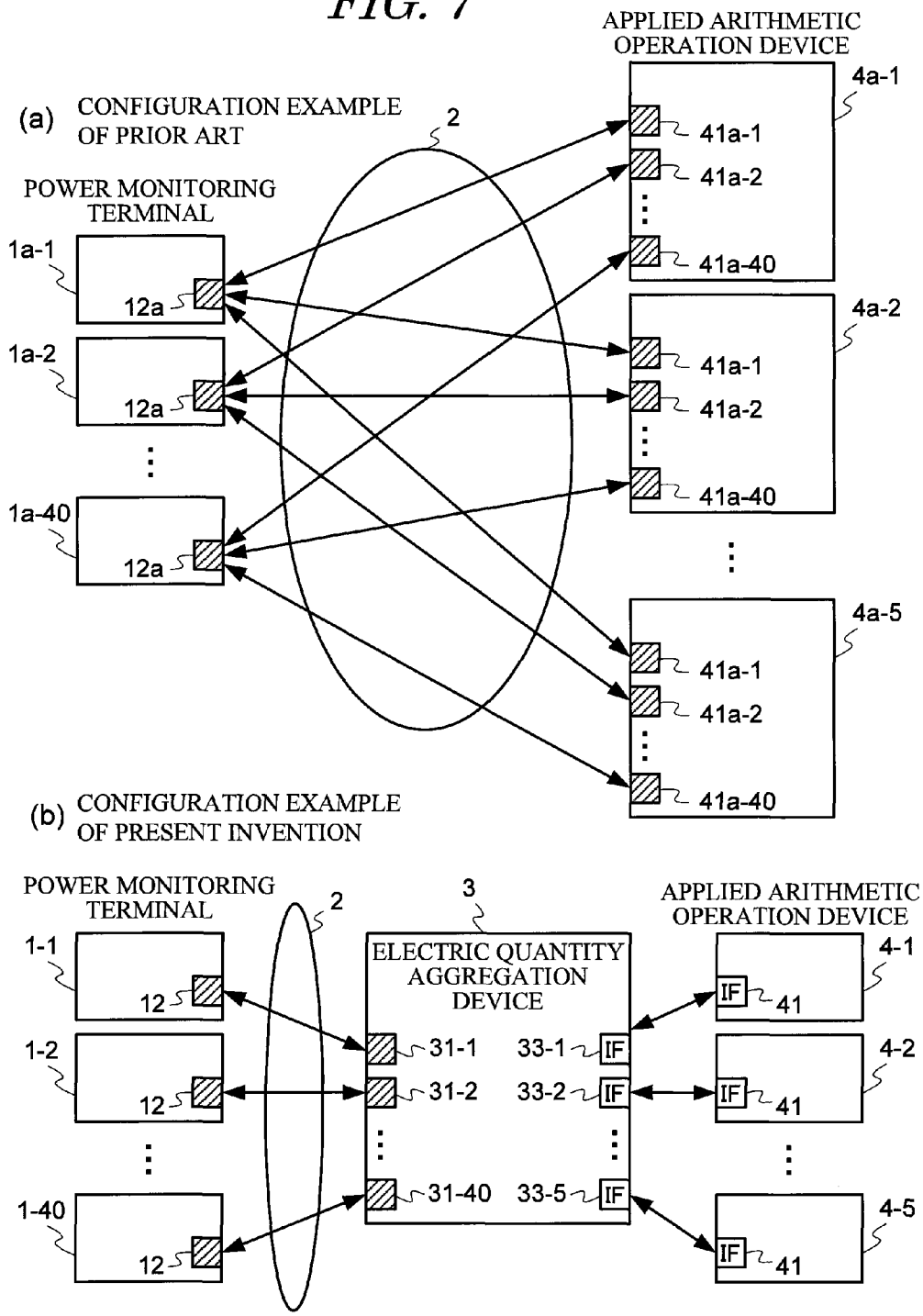
FIG. 7 are diagrams depicting an effect when the data transmission configuration of the entire system is simplified according to the first embodiment, where

FIG. 7 are diagrams showing the effect of simplification of the data transmission configuration in the entire system according to the present embodiment, where FIG. 7A is a configuration example of a prior art, and FIG. 7B is a configuration example of the present embodiment. As FIG. 7 shows, in the case when forty power monitoring devices are installed, and five applied arithmetic operation devices to perform respective applied arithmetic operation are installed, the forty transmission control units 41a-1 to 41a-40 are installed in each of the five applied arithmetic operation devices 4a-1 to 4a-5 respectively in the configuration example of the prior art in FIG. 7A, so the number of transmission control units 41*a* in all of the five applied arithmetic operation devices 4*a*-1 to 4*a*-5 is 200 (=40×5).

On the other hand, in the case of the configuration example of the present invention in FIG. 7B, which receives the electric quantity data of all the power monitoring terminals 1 collectively by the electric quantity aggregation device 3, the transmission control units required for receiving the electric quantity data from the power monitoring terminal 1 are only forty transmission control units 31-1 to 31-40 for receiving data from the forty power monitoring terminals 1-1 to 1-40 in the electric quantity aggregation device 3, and it is sufficient to install one interface 41 with the electric quantity aggregation device 3 in the five applied arithmetic operation devices 4-1 to 4-5 respectively.

[Modifications]

As modifications of the above-mentioned first embodiment, the following various modifications, for example, are possible.

In the first embodiment, GPS is used to perform synchronization in a wide area in the system, but the electric quantity may be sampled using a timing of the clock of each power monitoring terminal 1, without using GPS.

Figure 8:
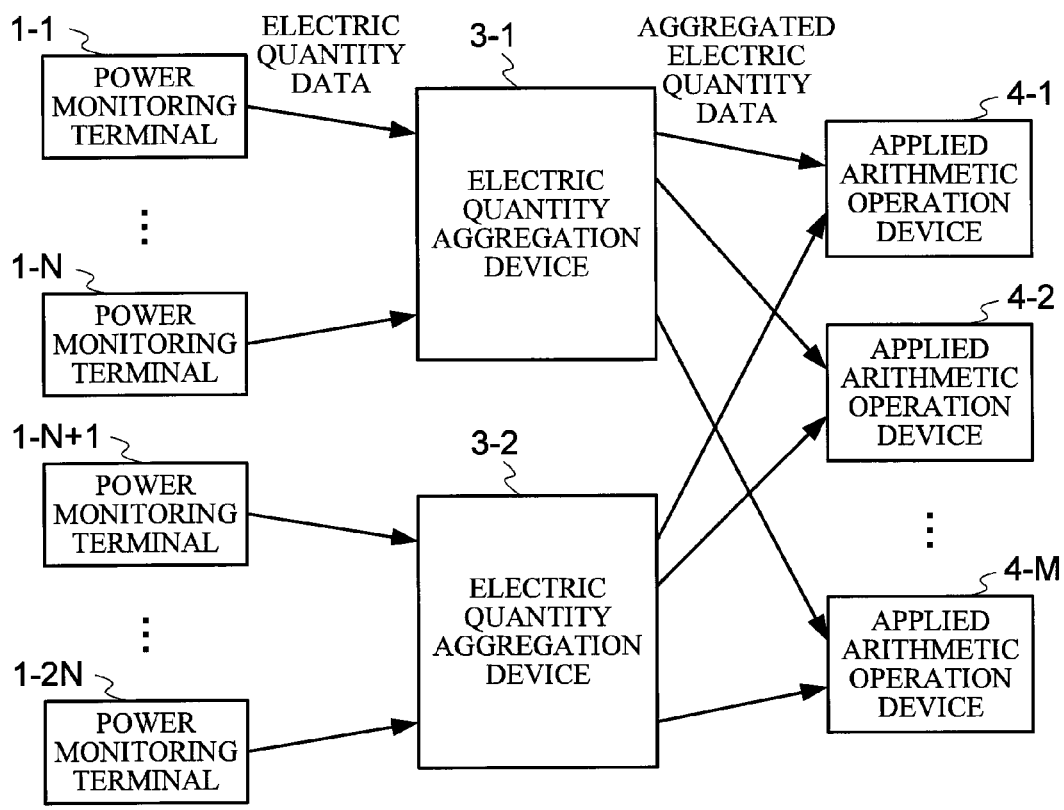
FIG. 8 is a block diagram depicting a modification of the first embodiment.

In the first embodiment, a case of receiving the electric quantity data from all the power monitoring terminals by one electric quantity aggregation device was described, but as a modification thereof, two electric quantity aggregation devices 3-1 and 3-2 may be installed, as shown in FIG. 8, so that each power monitoring terminal 1 is assigned to one of the electric quantity aggregation devices 3, and electric quantity data is transmitted from each power monitoring terminal 1 to the electric quantity aggregation device 3 (3-1 or 3-2) to which the terminal is assigned. FIG. 8 shows an example of the case when, among 2N power monitoring terminals 1-1 to 1-2N, the first to Nth power monitoring terminals 1-1 to 1-N are assigned to one electric quantity aggregation device 3-1, and the (N+1)th to 2N-th power monitoring terminals 1-(N+1) to 1-2N are assigned to the other electric quantity aggregation device 3-2.

According to the modification shown in FIG. 8, the processing load can be distributed between two electric quantity aggregation devices, so particularly when the processing load of the electric quantity aggregation device becomes heavy due to a dramatic increase in the power monitoring terminals, for example, the processing load of each electric quantity aggregation device can be decreased considerably. A configuration where the processing load is distributed to three or more electric quantity aggregation devices is also possible, and in this case, the processing load of each electric quantity aggregation device can be further decreased according to the number of electric quantity aggregation devices.

Figure 9:
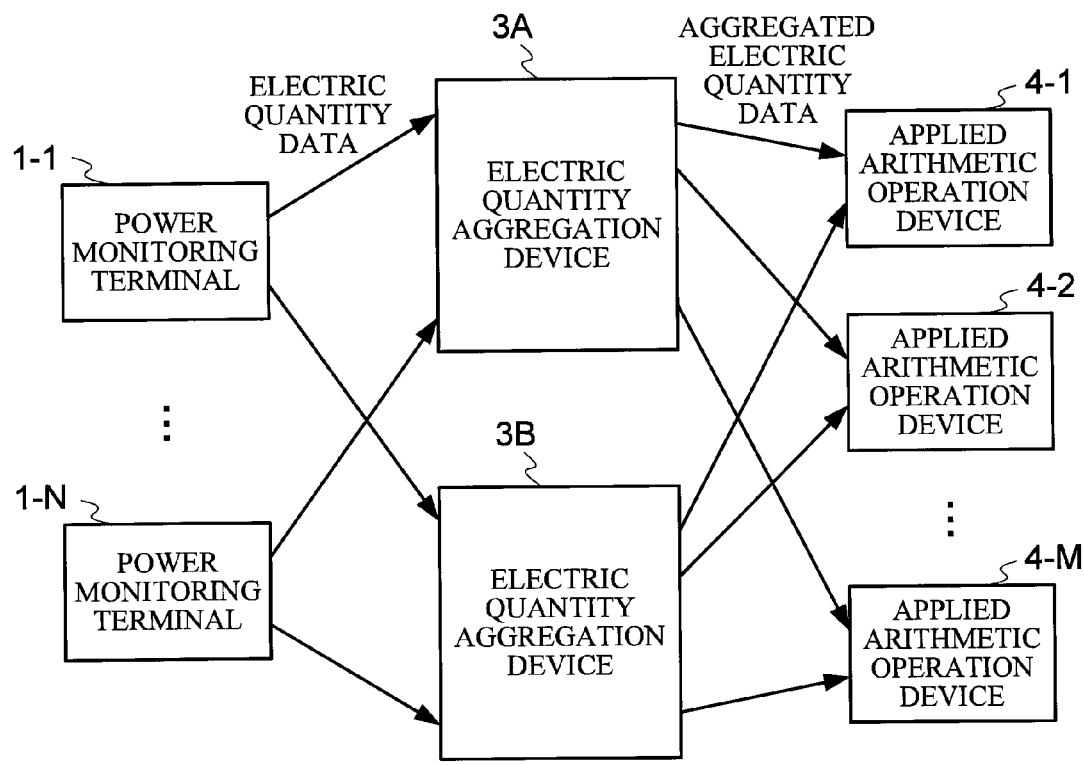
FIG. 9 is a block diagram depicting another modification of the first embodiment.

As another modification, two series of electric quantity aggregation devices, 3A and 3B, may be installed, as shown in FIG. 9, so that the electric quantity data is transmitted from each power monitoring terminal 1, to both of the two series of electric quantity aggregation devices 3A and 3B. According to this modification shown in FIG. 9, even if a failure occurs to one of the two series of electric quantity aggregation devices 3A and 3B, the system can be continuously operated using the other electric quantity aggregation device which has not failed, without shutting down the entire system, so the reliability of the entire system can be improved.

In the first embodiment, the magnitude and phase of the synchro-phasor quantity are used as a representation format of electric quantity information to be used for the electric quantity data which is transmitted from the power monitoring terminal to the electric quantity aggregation device, but the representation format of the electric quantity information that is used for the electric quantity data of the present invention is not limited to this, and instantaneous values of voltage and current may be used instead.

Figure 10:
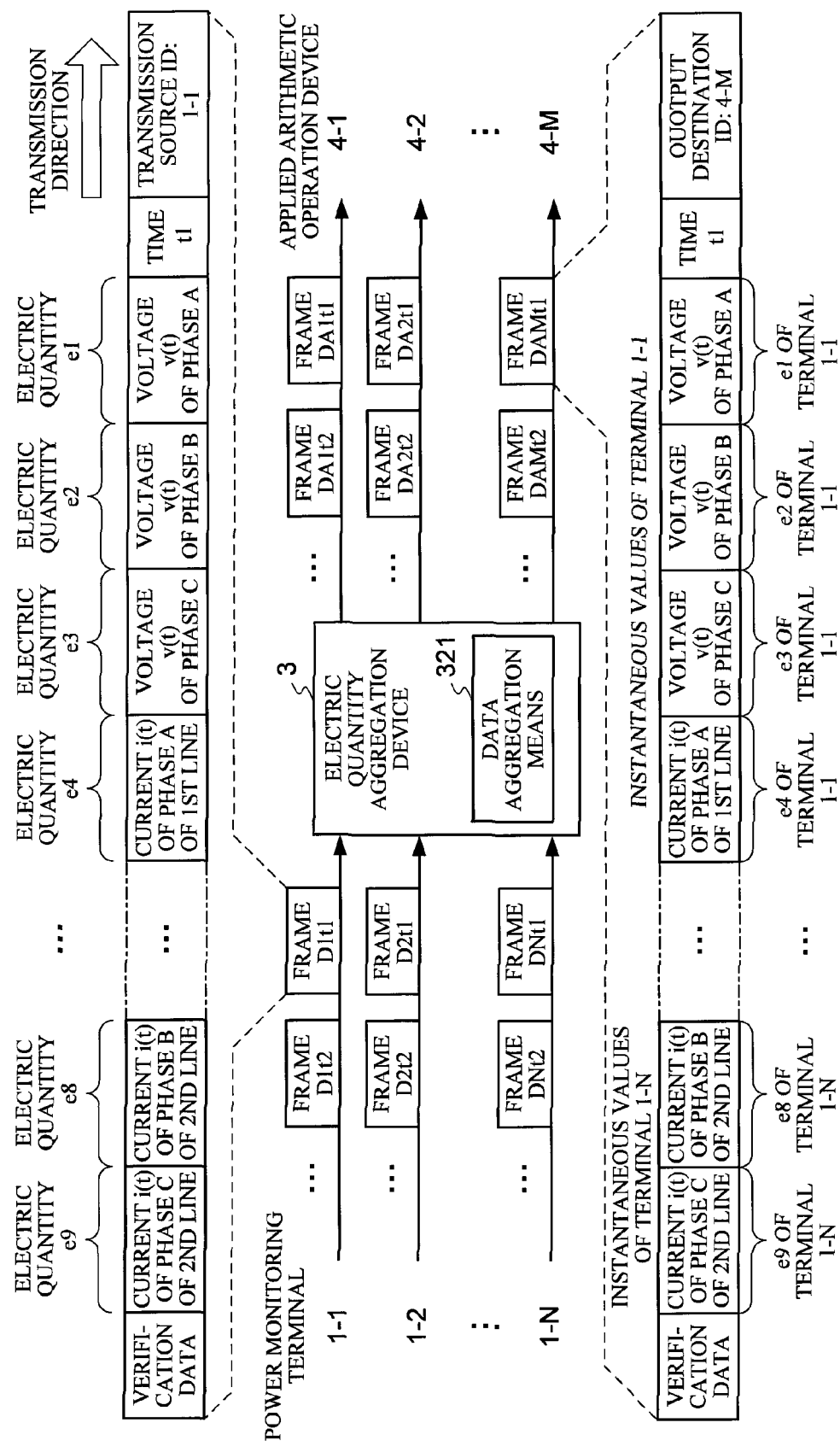
FIG. 10 is a diagram depicting a concrete processing example by the power quantity aggregation device in the case of using electric quantity data, including an instantaneous voltage value and an instantaneous current value, as another modification of the first embodiment.

FIG. 10 is a diagram showing a concrete processing example by the electric quantity aggregation device 3 in a case of using electric quantity data including the instantaneous voltage value v(t) and instantaneous current value i(t), where a concrete frame configuration of electric quantity data which the electric quantity aggregation device 3 receives from each power monitoring terminal 1, and a concrete frame configuration of an aggregated electric quantity data, which is generated by aggregating the electric quantity data having the above frame configuration by the electric quantity aggregation device 3, and transmitted to each applied arithmetic operation device, are shown respectively.

As FIG. 10 shows, the difference between the case of transmitting the instantaneous voltage value v(t) and instantaneous current value i(t) as the electric quantity data and the case of transmitting the synchro-phasor quantity, as shown in FIG. 4, is that the instantaneous value quantity at each sampling point is transmitted in the case of using instantaneous values, while the magnitude and phase are transmitted as a pair in the case of the synchro-phasor quantity.

The phasor quantity is acquired by the power monitoring terminal, converting the sampled instantaneous electric quantity, and an advantage of transmitting phasor quantity as the electric quantity data is that handling is easy when various applied arithmetic operation is performed at an applied arithmetic operation device using the phasor quantity aggregated by the electric quantity aggregation device. In the case of transmitting an instantaneous value as the electric quantity data, as shown in FIG. 10, on the other hand, the advantage is that arithmetic operation accuracy can be improved by improving the applied arithmetic operation, since the applied arithmetic operation device can handle the unprocessed data much closer to raw data.

Another possible modification related to this modification of the electric quantity data is that a selection function, to select whether a phasor quantity or an instantaneous value is transmitted from a same power monitoring terminal, is provided, and the electric quantity aggregation device instructs this selection. According to this modification, the electric quantity aggregation device handles both the phasor quantity and instantaneous values, but in this case, both of the above-mentioned effects of using the phasor quantity and instantaneous values can be implemented.

Another possible modification is that when an instantaneous value is transmitted from each power monitoring terminal, the analog filter characteristics (gain, frequency) of each power monitoring terminal are transmitted to the electric quantity aggregation device in the form of a function, and the transient response characteristic of each power monitoring terminal is converted using this function, so that the transient response characteristic of respective power monitoring terminals become equivalent in the arithmetic operation in each applied arithmetic operation device. An example of the conversion performed in the electric quantity aggregation device, in this case, is as follows.

$$f1 * g1 = F1$$

$$f2 * g2 = F2$$

-continued $$Fn * gn = Fn$$

Here, f1, f2, ..., fn are functions to indicate an analog filter characteristics of the power monitoring terminals 1 to n, g1, g2, ..., gn are conversion functions used in the electric quantity aggregation device, and F1, F2, ..., Fn are filter characteristics acquired by conversion at the applied arithmetic operation device side, corresponding to each power monitoring terminal. If the conversion function is appropriate, the characteristics of F1, F2, ..., Fn become the same.

By transferring these filter characteristics F1, F2, ..., Fn at the applied arithmetic operation device side corresponding to each power monitoring terminal from the electric quantity aggregation device to each applied arithmetic operation device in advance, each applied arithmetic operation device can perform highly accurate applied arithmetic operation using the filter characteristics F1, F2, ..., Fn, without independently solving the influence of difference of the filter characteristics of each power monitoring terminal. In other words, the generation of difference in the detection of transient change of the electric power system, which is generated by the [difference of] the filter characteristics of each power monitoring terminal, for example, can be prevented, therefore highly accurate applied arithmetic operation can be implemented.

Second Embodiment

[Configuration]

Figure 11:
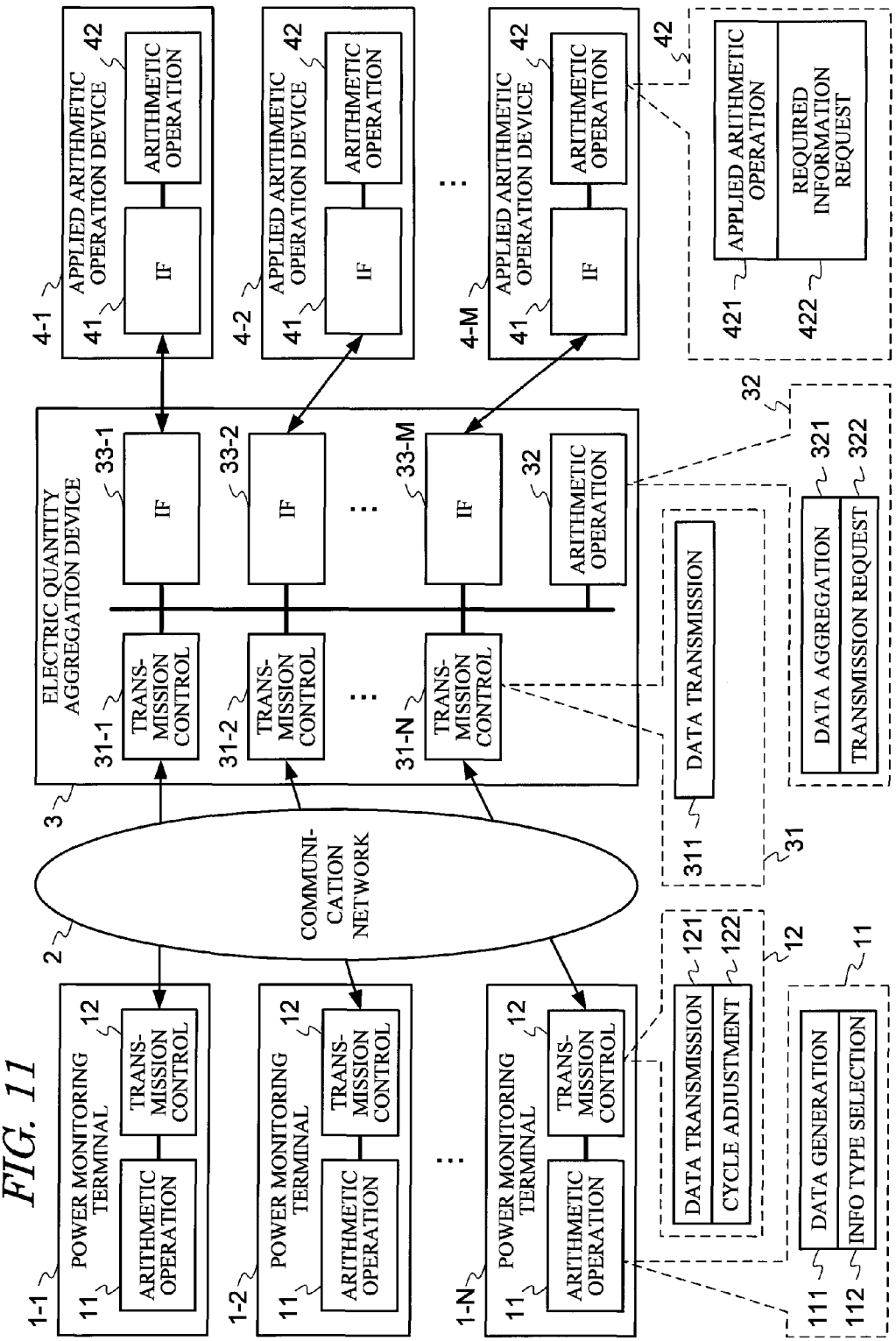
FIG. 11 is a block diagram depicting a main configuration of a wide area protection control system according to a second embodiment to which the present invention is applied.

FIG. 11 is a block diagram depicting a major configuration of a wide area protection control system according to a second embodiment to which the present invention is applied.

As FIG. 11 shows, the wide area protection control measurement system of the present embodiment is the system according to the first embodiment shown in FIG. 1, wherein required information request means 422 is added to the applied arithmetic operation device 4, data transmission request means 322 is added to the electric quantity aggregation device 3, and information type selection means 112 and transmission cycle adjustment means 122 are added to the power monitoring terminal 1.

Here the required information request means 422 of the applied arithmetic operation device 4 is means to request the information type and transmission cycle, which are required for the applied arithmetic operation, to the electric quantity aggregation device 3, and is implemented by a combination of an arithmetic operation unit 42 and software.

The data transmission request means 322 of the electric quantity aggregation device 3 is means for comparing and organizing the information type and transmission cycle included in a plurality of requests from a plurality of applied arithmetic operation devices 4, and determining the information type and transmission cycle to satisfy each request, and requesting data transmission based on the determined information type and transmission cycle to the power monitoring terminal 1. The data transmission request means 322 is implemented by a combination of the arithmetic operation unit 32 and software.

The information type selection means 112 of the power monitoring terminal 1 is means for selecting the information type according to the request from the electric quantity aggregation device 3, and the transmission cycle adjustment means 122 is means for adjusting the transmission cycle of the electric quantity data by the data transmission means 121 according to the request from the electric quantity aggregation device 3. The information type selection means 112 is implemented by the combination of the arithmetic operation unit 11 and software, and the transmission cycle adjustment means 122 is implemented by a combination of the transmission control unit 12 and software. The power monitoring terminal 1 generates the electric quantity data which includes the information type selected by the information type selection means 112, using the data generation means 111, and transmits the generated electric quantity data using the data transmission means 121 at a transmission cycle adjusted by the transmission cycle adjustment means 122.

[Actions]

The wide area protection control measurement system of the second embodiment having the above-mentioned configuration has the same actions as the first embodiment, and also has the following additional actions based on the plurality of means added in the present embodiment.

In the applied arithmetic operation performed in each applied arithmetic operation device 4, required information from the power monitoring terminal 1 is generally different depending on the content of the applied arithmetic operation. For example, an information type, required for operating the phase difference between transformer stations and magnitude shown in the above expressions (2) and (3) and magnitude thereof, is the magnitude and phase of the bus voltage phasor quantity of an arbitrary transformer station, and the transmission cycle of the power monitoring terminal required for this arithmetic operation is about 100 ms. An information type required for operating the frequency of the bus voltage of each transformer station shown by expression (4) is only the phase of the bus voltage phasor quantity of an arbitrary transformer station, and the transmission cycle required for this arithmetic operation is 40 ms (equivalent to 2 cycles in the case of a 50 Hz system). Thus the information type and transmission cycle of the power monitoring terminal 1 required by each applied arithmetic operation device 4 differs depending on the content of the applied arithmetic operation.

Figure 12:
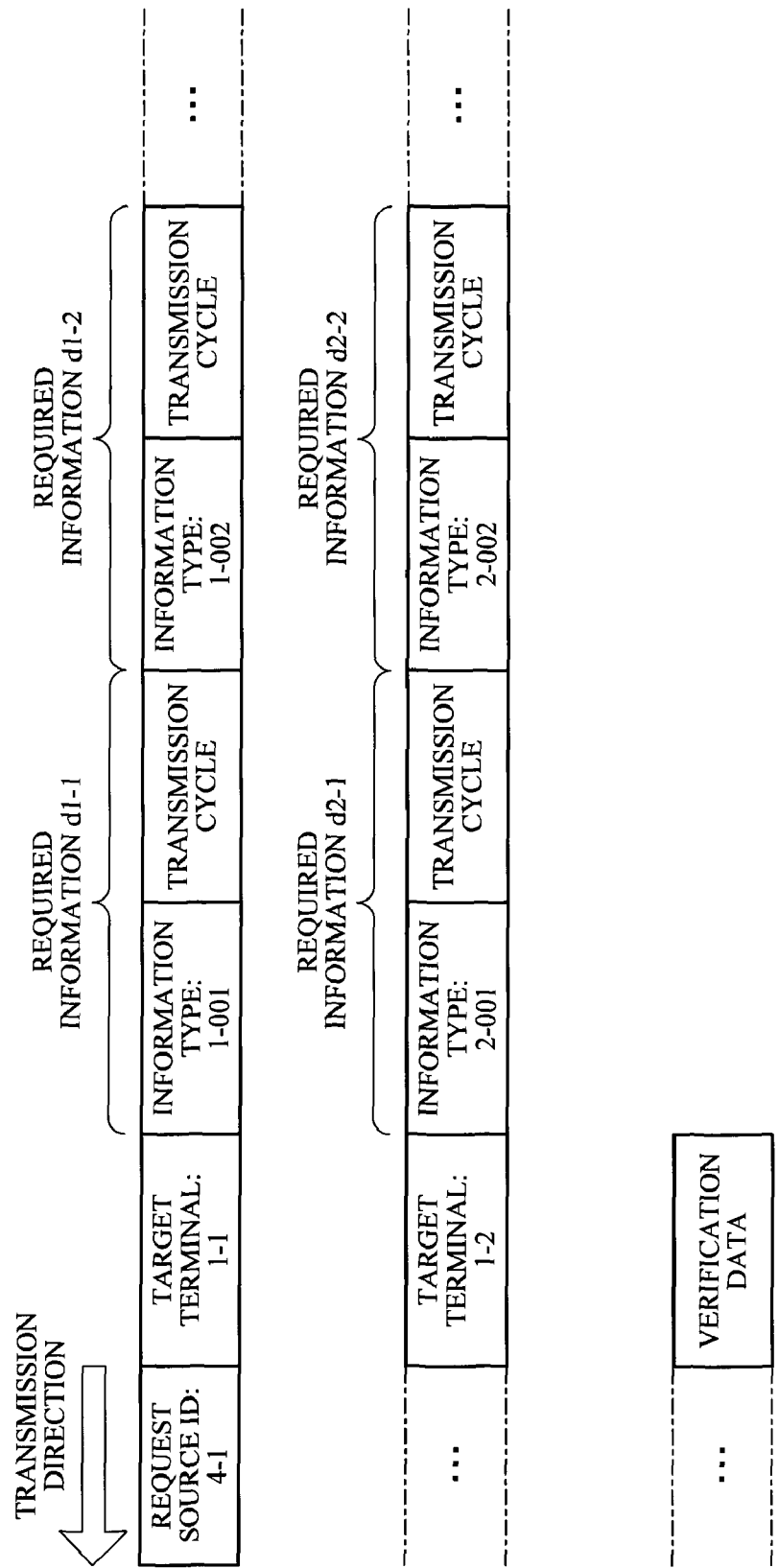
FIG. 12 is a diagram depicting a concrete frame configuration to request required information, which is outputted from an applied arithmetic operation device to an electric quantity aggregation device according to the second embodiment.

In the present embodiment, a required information request to indicate the information type and transmission cycle to be required is generated by the required information request means 422 according to the content of the applied arithmetic operation by the applied arithmetic operation means 421 of each applied arithmetic operation device 4, and the generated required information request is output to the electric quantity aggregation device 3 via the interface (IF) 41. FIG. 12 shows a concrete frame configuration of the required information request which is outputted from the required information request means 422 of the applied arithmetic operation device 4 to the electric quantity aggregation device 3 at this time via the interface 41.

In the example in FIG. 12, a device number "4-$m$" that indicates the m-th (m is an arbitrary integer in $1 \leq m \leq M$) applied arithmetic operation device (device number "4-1" to indicate the first applied arithmetic operation device in the case of FIG. 12) is attached in the beginning of the frame, as the request source ID which indicates the request source applied arithmetic operation device, and after this request source ID, information which this applied arithmetic operation device 4 needs for applied arithmetic operation is described as required information.

In the required information request in FIG. 12, a terminal number "1-$n$" to indicate the n-th (n is an arbitrary integer in $1 \leq n \leq N$) power monitoring terminal following by one required information "dn-1", which consists of a combination of the electric quantity information type (e.g. phase a voltage of bus, phase a current of first line of power transmission line) measured by this target terminal, and a transmission cycle (e.g. one phasor quantity for once in two cycles, one phasor quantity for once in 10 cycles) which is required for the electric quantity of this electric quantity information type, is specified for each one of the power monitoring terminal 1-1 to 1-N to be the target. In the same manner, specifications of the required information "dn-p" (p is an arbitrary integer in 1≦p) which consists of a combination of another electric quantity information type to be measured by the power monitoring target terminal "1-n" and transmission cycle is repeated.

The required information request is completed when the verification data to perform a data check using CRC or the like to the end of the frame after all the required information to be acquired from all the target power monitoring terminals are specified.

In the electric quantity aggregation device 3, each required information request, which is outputted from each applied arithmetic operation device 4, is acquired via each corresponding interface 33, and a plurality of required information requests are collected. The information types and transmission cycles included in these plurality of collected required information requests are compared and organized by the data transmission request means 322, the information type and transmission cycle to satisfy each required information request are determined, then a data transmission request, to request data transmission based on the determined information type and transmission cycle to the power monitoring terminal, is generated, and the generated data transmission request is sent to the target power monitoring terminal 1 by the data transmission means 311 via the communication network 2.

When the required information requests, which are output from each applied arithmetic operation device 4, are collected like this, redundant required information is often included. The data transmission request means 322 organizes such redundant required information according to a predetermined rule. Examples of possible rules to be the predetermined rule, which the data transmission request means 322 uses, are as follows.

"Rule (I): The same required information which consists of the same information type and same transmission cycle to a same power monitoring terminal, which are requested from different applied arithmetic operation devices, are redundant, so these required information are unified into a data transmission request to this power monitoring terminal. For different types of required information, a data transmission request is generated such that all these information types are embraced."

"Rule (II): Concerning the same required information which consists of the same information type and different transmission cycles, to a same power monitoring terminal, which are requested from different applied arithmetic operation devices, the information types are unified, and transmission cycles are unified to a shorter one of the cycles to generate a data transmission request to this power monitoring terminal."

As mentioned above, required information types to compute phase difference between transformer stations and magnitude, shown in expressions (2) and (3), are the magnitude and phase of the bus voltage phasor quantity of an arbitrary transformer station, and the transmission cycle of the power monitoring terminal required for this arithmetic operation is about 100 ms. Required information types to compute frequency of the bus voltage of each transformer station, such as shown in expression (4), are only the phase of the bus voltage phasor quantity of an arbitrary transformer station, and the transmission cycle required for this arithmetic operation is 40 ms (equivalent to two cycles in a 50 Hz system).

For example, if there are two requests to perform these two types of applied arithmetic operation, the magnitude and phase of the bus voltage phasor quantity are determined as an information type which embraces these requests according to Rule (I), and a shorter cycle, 40 ms, is determined as the transmission cycle according to Rule (II) by the data transmission request means 322. A frame of a data transmission request based on the determined information type and transmission cycle is generated by the data transmission request means 323, and the generated data transmission request frame is sent to the target power monitoring terminal 1 via the communication network 2 by the data transmission means 311.

Figure 13:
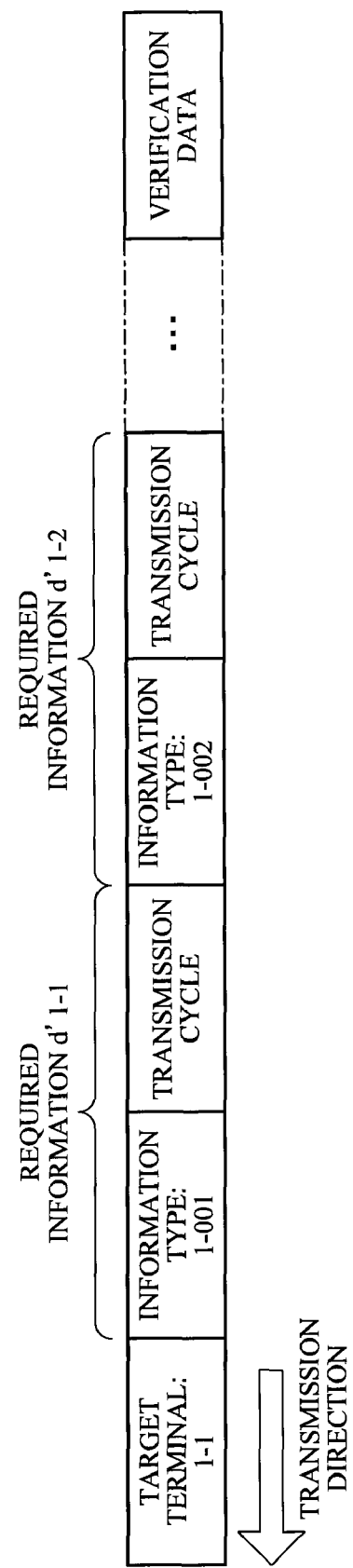
FIG. 13 is a diagram depicting a concrete frame configuration to request data transmission, which is transmitted from the electric quantity aggregation device to a power monitoring terminal via a communication network according to the second embodiment.

FIG. 13 is a diagram showing a concrete frame configuration of the data transmission request which the data transmission request means 322 of the electric quantity aggregation device 3 sends from the data transmission means 311 to the power monitoring terminal 1 via the communication network 2 according to Rules (I) and (II). In the example in FIG. 13, the terminal number "1-n", to indicate the n-th power monitoring terminal to be the target, is specified in the beginning of the frame, then the required information "d'n-1" to "d'n-p" (p is an arbitrary integer in 1≦p) which consists of a combination of the electric quantity information type to be measured by this power monitoring terminal and transmission cycle thereof are all specified, and then the verification data to perform a data check by CRC or the like is attached at the end of the frame, thereby the data transmission request is completed.

In the power monitoring terminal 1, when the data transmission means 121 receives the data transmission request sent from the electric quantity aggregation device 3, the information type selection means 112 selects an information type according to this data transmission request from the electric quantity aggregation device 3, and the transmission cycle adjustment means 122 adjusts the transmission cycle of the electric quantity data from the data transmission means 121 according to the request from the electric quantity aggregation device 3. When the information type is selected by the information type selection means 112, the data generation means 111 generates electric quantity data including the selected information type, and the generated electric quantity data is sent by the data transmission means 121 via the communication network 2 at the transmission cycle adjusted by the transmission cycle adjustment means 122. A concrete frame configuration of the electric quantity data which is sent from the power monitoring terminal 1 is the same as the above-mentioned frame configuration shown in FIG. 4 and FIG. 10, for example, hence description here is omitted.

[Effects]

As described above, according to the wide area protection control measurement system of the second embodiment, a plurality of requests on the information type and transmission cycle from a plurality of applied arithmetic operation devices 4-1 to 4-M are compared and organized by the electric quantity aggregation device 3, and overlapping requests are unified, whereby the information type and transmission cycle to satisfy each request are determined, and data transmission based on the determined information type and transmission cycle is requested to each power monitoring terminal 1-1 to 1-N. According to this wide area protection control measurement system of the second embodiment, the following effects can be obtained in addition to the effects of the first embodiment.

In each applied arithmetic operation device, various applied arithmetic operation may be performed, so the information type and transmission cycle required for each applied arithmetic operation device are often different from each other. According to the present embodiment, a plurality of requests on the information type and transmission cycle from a plurality of applied arithmetic operation devices are compared and organized, and redundant requests are aggregated by the electric quantity aggregation device, then data transmission that satisfies each request is requested to each power monitoring terminal. Therefore unnecessary redundancy is eliminated from the electric quantity data which is transmitted from each power monitoring terminal responding to a data transmission request from the electric quantity aggregation device, and only necessary information with minimum data volume can be transmitted efficiently. Since load on the communication network due to the transmission of electric quantity data from each power monitoring terminal can be minimized, economy and reliability of the system can be further improved.

When a new applied arithmetic operation device is added, or when various kinds of changes, including the removal of a existing applied arithmetic operation device, occur, optimum and minimum information types that are required can be selected according to the addition or change of the applied arithmetic operation device, by aggregating a plurality of requests, including a request from a new applied arithmetic operation device or a request from an applied arithmetic operation device where the change occurred, in the electric quantity aggregation device, therefore the change operation of each power monitoring terminal and other applied arithmetic operation devices is unnecessary. Since the data volume of the electric quantity data to be transmitted from the power monitoring terminal can be minimized, and load on the communication network can be controlled to be the minimum, that is required when applied arithmetic operation functions are added or changed, economy and reliability of the system can be further improved.

[Modifications]

As modifications of the above-mentioned second embodiment, the following modifications, for example, are possible.

In the second embodiment, electric quantity information types, such as voltage and current, are used as an information type requested from an applied arithmetic operation device as an example, but when an applied arithmetic operation is performed, another subsidiary information type obtained in an electric-supply station, such as a transformer station, may be required in some cases. Such subsidiary information types specifically are make and break information of various kinds of switchgear, including breakers and disconnectors, operation and recovery information of protective relays, and ON/OFF information of other power equipment, for example.

When an applied arithmetic operation device requires these subsidiary information types as well, required information which consists of a necessary subsidiary information type and transmission cycle is specified for the request frame of the required information request, as shown in FIG. 12, whereby the electric quantity aggregation device organizes the required information and determines an optimum subsidiary information type according to the above-mentioned required information organization rules, and requests data transmission to each power monitoring terminal. In this case, each power monitoring terminal periodically transmits the requested subsidiary information type using a frame configuration shown in FIG. 4 and FIG. 10 (only replacing the electric quantity information type with a subsidiary information type).

If the applied arithmetic operation device requires both the electric quantity information type and subsidiary information type, the electric quantity aggregation device determines an optimum electric quantity information type and an optimum subsidiary information type, and requests data transmission to each power monitoring terminal. In this case, each power monitoring terminal periodically transmits the requested electric quantity information type and subsidiary information type using the frame configuration shown in FIG. 4 and FIG. 10 (only adding the subsidiary information type to the electric quantity information type).

Third Embodiment

Configuration

Figure 14:
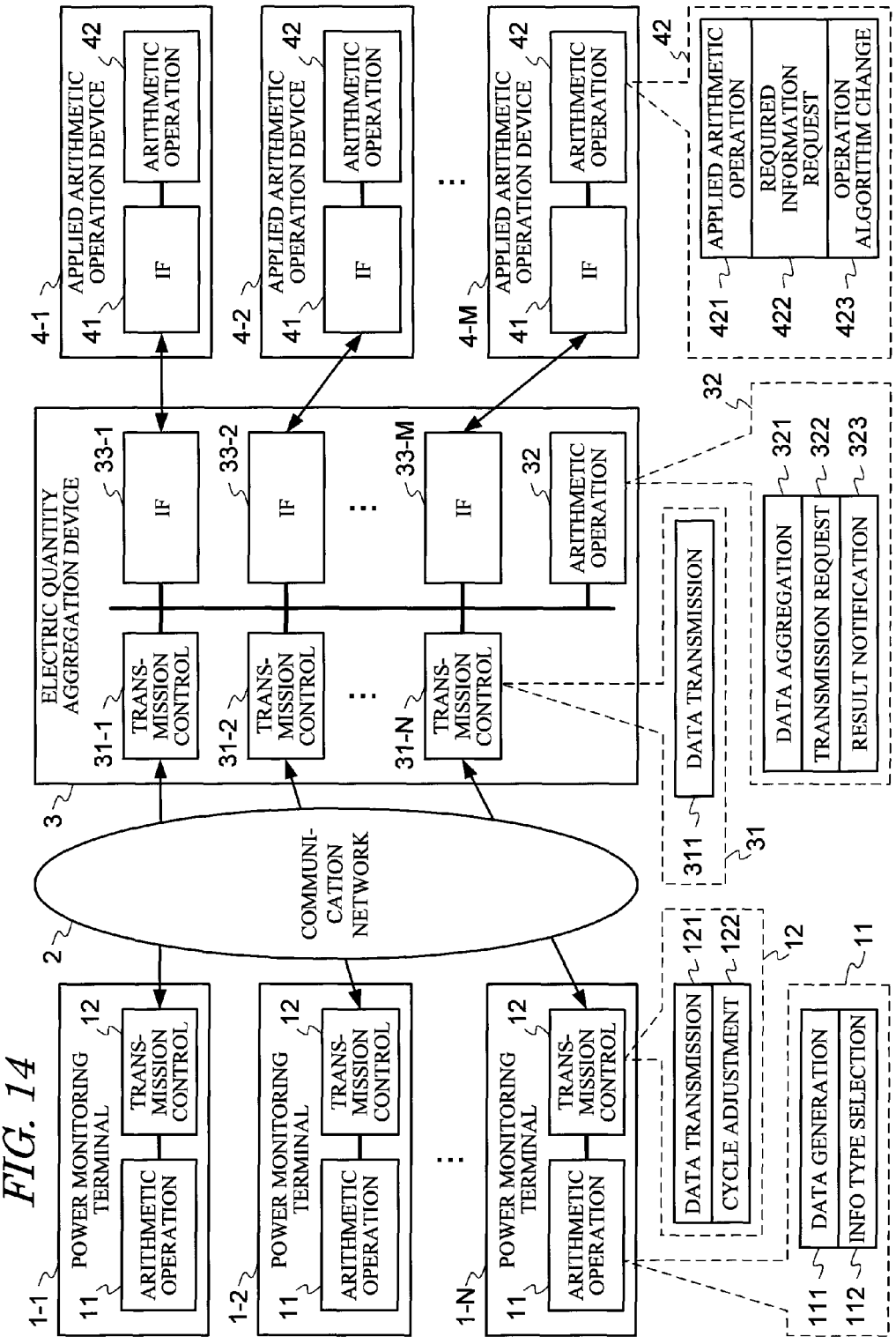
FIG. 14 is a block diagram depicting a main configuration of a wide area protection control system according to a third embodiment to which the present invention is applied.

FIG. 14 is a block diagram depicting a main configuration of a wide area protection control system according to a third embodiment to which the present invention is applied.

As FIG. 14 shows, the wide area protection control measurement system of the present embodiment is the system of the second embodiment shown in FIG. 11, where decision result notification means 323 is added to the electric quantity aggregation device 3, and operation algorithm change means 423 is added to the applied arithmetic operation device 4.

The decision result notification means 323 of the electric quantity aggregation device 3 is means for notifying the information type and transmission cycle determined by the data transmission request means 322 to each applied arithmetic operation device 4 at the request source as the decision result, and is implemented by a combination of the arithmetic operation unit 32 and software. The operation algorithm change means 423 of the applied arithmetic operation device 4 is means for changing the applied arithmetic operation algorithm based on the information type and transmission cycle notified by the electric quantity aggregation device 3, and is implemented by a combination of the arithmetic operation unit 42 and software.

[Actions]

The wide area protection control measurement system of the third embodiment having the above-mentioned configuration has the same actions as the second embodiment, and also has the following additional actions based on the plurality of means added in the present embodiment.

In the present embodiment, a plurality of required information requests from a plurality of applied arithmetic operation devices 4 are organized by the data transmission request means 322 of the electric quantity aggregation device 3, and an optimum information type and transmission cycle to transmit data from the power monitoring terminal are determined, and this function is the same as the second embodiment. The present embodiment, however, has an additional function where the determined information type and transmission cycle are notified to each applied arithmetic operation device 4 at the request source by the decision result notification means 323 of the electric quantity aggregation device 3, and according to the decided information type and transmission cycle, the applied arithmetic operation algorithm is changed by the operation algorithm change means 423 of the applied arithmetic operation device 4.

For example, as described in the second embodiment, the information type required for operating the phase difference and magnitude among the transformer stations shown in the above-mentioned expressions (2) and (3) are the magnitude and phase of the bus voltage phasor quantity of an arbitrary transformer station, and the transmission cycle of the power monitoring terminal required for this arithmetic operation is about 100 ms. The information type required for the frequency operation of the bus voltage of each transformer station shown in the above Expression (4) is only the phase of the bus voltage phasor quantity of an arbitrary transformer station, and the transmission cycle required for this arithmetic operation is 40 ms (equivalent to two cycles in the case of a 50 Hz system).

Therefore if there are two required information requests to perform these two types of applied arithmetic operation, the data transmission request means 322 of the electric quantity aggregation device 3 determines the magnitude and phase of the bus voltage phasor quantity as the information type that embraces these requests according to Rule (I) mentioned in the second embodiment, and determines a shorter 40 ms cycle as the transmission cycle according to Rule (II).

The optimum information type (magnitude and phase of the bus voltage phasor quantity in this example) and the transmission cycle (40 ms in this example) determined by the data transmission request means 322 like this are sent to the applied arithmetic operation device 4 at the request source by the decision result notification means 323. The applied arithmetic operation device 4, which received this decision result, changes the applied arithmetic operation algorithm using the operation algorithm change means 423. In the case of the above example, the following algorithm change is performed.

In the above expressions (2) and (3), the transmission cycle is 40 ms, in which the phasor quantity can be acquired once, while what is actually needed is acquiring the phasor quantity once every 100 ms or so, therefore the algorithm change means 423 changes the applied arithmetic operation algorithm accordingly. Specifically, the magnitude and phase of the voltage phasor, which are determined once every 40 ms, are acquired continuously three times, and the averages thereof are determined and used as the operation quantity of expressions (2) and (3), instead of the voltage phasor acquired once every 100 ms. Thereby arithmetic operation is performed once every 120 ms, but the operation accuracy improves because of the averaging processing. This change of the applied arithmetic operation algorithm can be easily implemented by programming the execution of the averaging processing of the phasor quantity according to the transmission cycle in advance, when a program for changing the operation algorithm is created.

In the above expressions (4) and (5), the differential operation is performed to acquire the frequency, but what is required is only the differentiation of the phase, so only the phase of the bus voltage phasor is used as the required information type. As mentioned above, the magnitude of the bus voltage phasor quantity can also be acquired, so the operation algorithm change means 423 additionally computes the following expression (6), and computes the above expressions (4) and (5) only when this expression (6) is established.

$$|Vi| < Vk \quad (6)$$

By additionally executing the operation of expression (6) like this, the frequency calculation in expressions (4) and (5) can be executed only when the voltage drops to a predetermined value or less due to a system accident, without performing applied arithmetic operation when the frequency fluctuates due to a cause other than a system accident (e.g. human operation, transient noise), and operation efficiency can be improved. This additional execution of operation of expression (6) can be easily implemented if an internal program equivalent to expression (6) is embedded in advance when a program for changing the operation algorithm is created, so that this internal program is driven when a magnitude of voltage is received.

[Effects]

As described above, the wide area protection control measurement system of the third embodiment determines the information type and transmission cycle which satisfy a plurality of requests from a plurality of applied arithmetic operation devices 4-1 to 4-M, notifies this decision content to the applied arithmetic operation device at the request source when data transmission based on the decided information type and transmission cycle is requested to each power monitoring terminal 1-1 to 1-N, and changes the applied arithmetic operation algorithm according to the determined information type and transmission cycle. According to the wide area protection control measurement system of the third embodiment, the following effects can be implemented in addition to the effects of the second embodiment.

By reflecting the information type and transmission cycle determined according to the request from each applied arithmetic operation device to the applied arithmetic operation at each applied arithmetic operation device at the request source, each applied arithmetic operation device can utilize the acquired information efficiently to the fullest, so reliable applied arithmetic operation can be implemented with higher efficiency and higher accuracy.

Fourth Embodiment

Configuration

Figure 15:
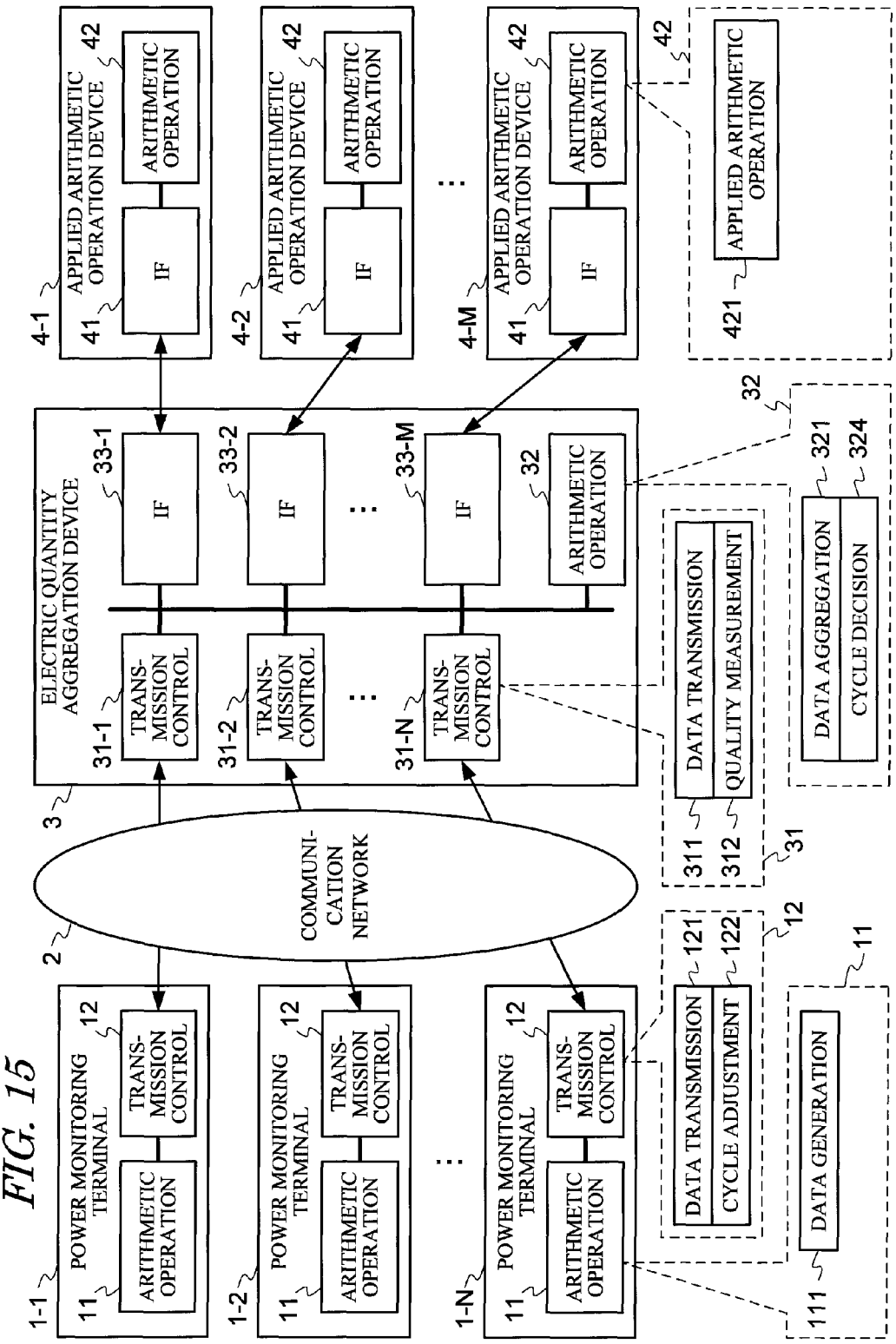
FIG. 15 is a block diagram depicting a main configuration of a wide area protection control system according to a fourth embodiment to which the present invention is applied.

FIG. 15 is a block diagram depicting a main configuration of a wide area protection control system according to a fourth embodiment to which the present invention is applied.

As FIG. 15 shows, the wide area protection control measurement system of the present embodiment is the system of the first embodiment shown in FIG. 1, where transmission quality measurement means 312 and transmission cycle decision means 324 are added to the electric quantity aggregation device 3, and transmission cycle adjustment means 122 is added to the power monitoring terminal 1.

The transmission quality measurement means 312 of the electric quantity aggregation device 3 is means for measuring the transmission quality between each power monitoring terminal 1 at the transmission source and the electric quantity aggregation device 3 based on the electric quantity data received by the data transmission means 311, and is implemented by a combination of the transmission control unit 31 and software. The transmission cycle decision means 324 is means for determining the transmission cycle of the electric quantity data from the power monitoring terminal 1 at the transmission source based on the measured transmission quality and transmission cycle change condition which is set in advance, and requesting the adjustment to the decided transmission cycle to the power monitoring terminal 1 at the transmission source, and is implemented by a combination of the arithmetic operation unit 32 and software. The transmission cycle decision means 324 may be implemented by a combination of the transmission control unit 31 and software.

The transmission cycle adjustment means 122 of the power monitoring terminal 1 is means for adjusting the transmission cycle of the electric quantity data by the data transmission means 121 according to the request from the electric quantity aggregation device, and is implemented by a combination of the transmission control unit 12 and software. The power monitoring terminal 1 transmits the electric quantity data generated by the data generation means 111 through the data transmission means 121, at the transmission cycle adjusted by the transmission cycle adjustment means 122.

[Actions]

The wide area protection control measurement system of the fourth embodiment having the above-mentioned configuration has the same actions as the first embodiment, and also has the following additional actions based on the plurality of means added in the present embodiment.

In the present embodiment, the electric quantity data from the power monitoring terminal 1 is received from the data transmission means 311 of the electric quantity aggregation device 3 via the communication network 2, which is the same as the first embodiment. According to the present embodiment, the transmission quality between each power monitoring terminal 1 at the transmission source and electric quantity aggregation device 3 is measured by the transmission quality measurement means 312 of the electric quantity aggregation device 3 based on the received electric quantity data. Three concrete examples of the content of the transmission quality to be measured follow.

"slow down of response: a case of the electric quantity data from the power monitoring terminal not arriving within a predetermined period"

"data error: a case of detecting a transmission data error by CRC"

"communication disconnection: a case of not receiving a data frame itself"

Out of these three examples, "communication disconnection" is a state where data itself cannot be received due to a physical failure, such as a disconnection of a communication cable, and is outside the scope of the present embodiment. Therefore the targets of transmission quality measurement of the present embodiment are "slow down of response" and "data error". In the case of "slow down of response", it is highly possible that more communication traffic is generated than in bands that the communication network are using. In the case of "data error", it is highly possible that a part of data has been altered due to a transient failure in or noise on a transmission path of a communication cable or communication equipment.

The transmission quality measurement means 312 constantly measures whether the "assumed transmission cycle+margin time<data receiving interval" is established in order to detecting a "slow down in response", and detects a data error using CRC in order to detect a "data error". When the transmission quality is measured by these methods, the result thereof is transferred to the transmission cycle decision means 324.

The transmission cycle decision means 324 determines the transmission cycle of the electric quantity data from the power monitoring terminal 1 at the transmission source according to the transmission quality received from the transmission quality measurement means 312 based on the following Rules (i) and (ii), for example.

"Rule (i): receives data at the current transmission cycle if the transmission quality is better than a predetermined value."

"Rule (ii): decreases the transmission cycle and adjusts to become a state equivalent to Rule (i) if the transmission quality is worse than a predetermined value."

When the transmission cycle is determined based on Rules (i) and (ii), the transmission cycle decision means 324 sends the request to adjust the transmission cycle to this determined cycle to the power monitoring terminal 1.

When the data transmission means 121 receives the transmission cycle adjustment request from the electric quantity aggregation device 3 in the power monitoring terminal 1, the transmission cycle adjustment means 122 adjusts the transmission cycle of the electric quantity data by the data transmission means 121 according to the request. As a result, the electric quantity data generated by the data generation means 111 is sent to the electric quantity aggregation device 3 via the data transmission means 121 at the transmission cycle adjusted by the transmission cycle adjustment means 122.

[Effects]

As described above, the wide area protection control measurement system of the fourth embodiment measures the transmission quality between the power monitoring terminal 1 and the electric quantity aggregation device 3, determines the transmission cycle of the data transmission from the power monitoring terminal according to the measured transmission quality, and requests the data transfer based on the determined transmission cycle to each power monitoring terminal 1. According to the wide area protection control measurement system of the fourth embodiment, the following effects can be implemented in addition to the effects of the first embodiment.

The transmission quality of the communication network may drop due to various causes, but in such a case of a drop in transmission quality, the transmission cycle of the electric quantity data from the power monitoring terminal can be changed according to the transmission quality, so accurate electric quantity data can be sent from the power monitoring terminal to the electric quantity aggregation device avoiding an increase in communication traffic or the generation of transient noise.

Also it is difficult to determine a transmission cycle estimating the future state of the communication network at the point of system construction, so if the transmission cycle is fixed, unlike the present embodiment, a delay in the arrival of electric quantity data could become conspicuous or arrival could be cut-off completely as the transmission quality of the communication network drops. In such a case, a predetermined electric quantity data cannot be acquired at a timing required for the applied arithmetic operation, hence the performance required for the entire system cannot be implemented. In the case of the present embodiment, on the other hand, the transmission cycle is appropriately adjusted according to the state of the communication network, so the arrival of electric quantity data is never cut-off, and a delay in the arrival can also be controlled to a minimum time, and as a result, a highly reliable system can be constructed.

[Modifications]

As the modifications of the above-mentioned fourth embodiment, the following various modifications, for example, are possible.

In the fourth embodiment, a case of adjusting the transmission cycle of the power monitoring terminal at the transmission source, based on the transmission quality between the power monitoring terminal and electric quantity aggregation device measured based on the electric quantity data received by the electric quantity aggregation device, was described. But if the communication traffic drops the transmission quality (slow down of response), it is effective to adjust the transmission cycle of other power monitoring terminals as well, in addition to the power monitoring terminal at the transmission source for which a drop in transmission quality was measured.

In this way, if a slow down in response is detected by a data transmission means of a specific transmission control unit, the transmission cycle decision means of the arithmetic operation unit determines the transmission cycle of the power monitoring terminal connected to a specific transmission control unit, and determines the transmission cycle of the power monitoring terminals connected to other transmission control units at the same time, and requests an adjustment to the determined transmission cycle to each power monitoring terminal, thereby the communication traffic problem is solved.

As a modification combining the third and fourth embodiments, a configuration to notify the transmission cycle of the power monitoring terminal determined by the electric quantity aggregation device to the applied arithmetic operation device and change the applied arithmetic operation algorithm is also possible. In this case, the applied arithmetic operation algorithm can be appropriately changed according to the transmission quality between the power monitoring terminal and the electric quantity aggregation device, so each applied arithmetic operation device can effectively utilize the acquired information.

Fifth Embodiment

Configuration

Figure 16:
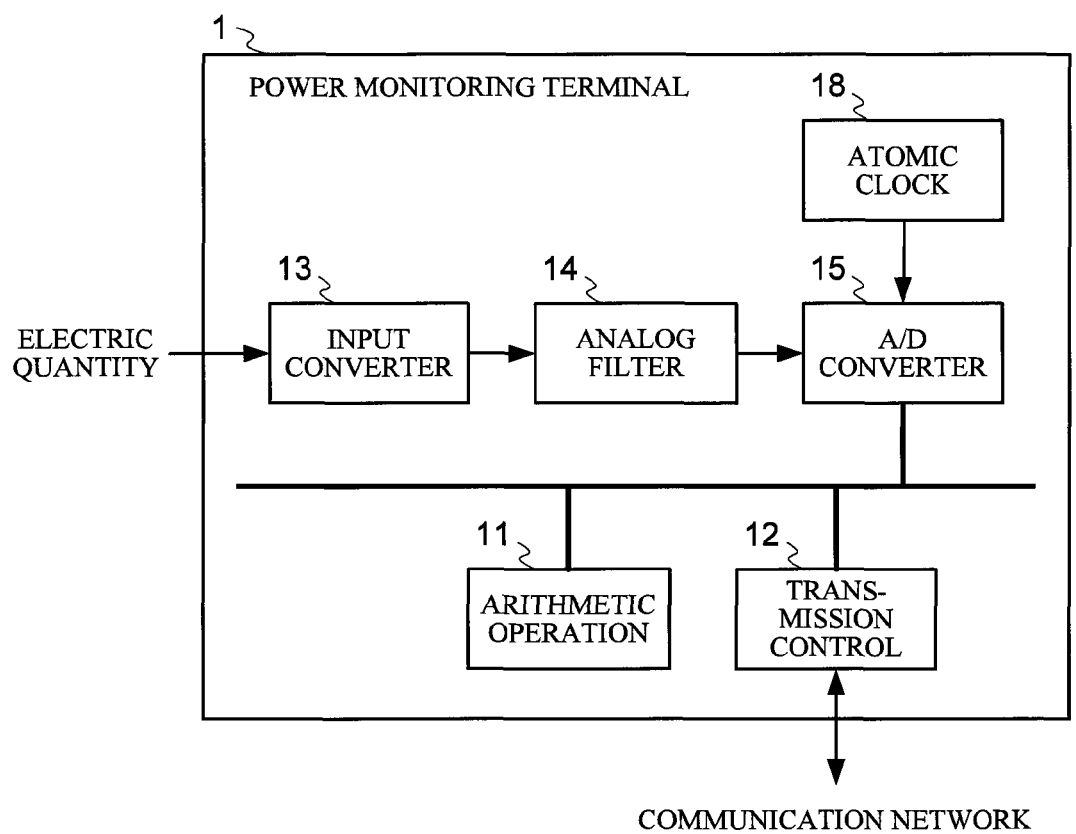
FIG. 16 is a diagram depicting an example of a hardware configuration of each power monitoring terminal according to a fifth embodiment to which the present invention is applied.

FIG. 16 is a diagram depicting an example of a hardware configuration of each power monitoring terminal 1 according to a fifth embodiment to which the present invention is applied. As FIG. 16 shows, the present embodiment uses an atomic clock 18, based on cesium and rubidium standards, for example, instead of the time synchronization unit 16 and the GPS receiver 17 in the power monitoring terminal 1 of the first embodiment shown in FIG. 2. Each power monitoring terminal 1 generates electric quantity data with time by the data generation means 111 (FIG. 1) of the arithmetic operation unit 11 using time of the atomic clock 18 of each terminal. The other configuration is the same as the first embodiment.

[Actions]

The wide area protection control measurement system of the fifth embodiment having the above configuration has the same actions as the first embodiment, but the present embodiment has the following additional actions because of the atomic clock 18 of the power monitoring terminal 1.

In the above-mentioned first embodiment, data received form the GPS is used for clock synchronization in a wide area, but in the present embodiment, the atomic clock 18 is used instead, and sampling of electric quantity and analog/digital conversion are performed using signal pulses generated at a predetermined time from the atomic clock 18, and absolute time based on the atomic clock 18 is added to this digitized electric quantity. By using the absolute time of the atomic clock 18 like this, the electric quantity data from a plurality of power monitoring terminals are sampled at a same timing, and accurate synchronous data is generated. In the electric quantity aggregation device 3, these accurate synchronous data are aggregated, and sent to each applied arithmetic operation device 4, so highly accurate applied arithmetic operation is performed in each applied arithmetic operation device 4, using this accurate synchronous data.

[Effects]

According to the above-mentioned wide area protection control measurement system of the fifth embodiment, the following effects are implemented in addition to the effects of the first embodiment.

In the case of using the receive signals of a GPS as in the case of the first embodiment, a time synchronization error can be suppressed to about 1 μsecond. However, if a failure occurs to the GPS satellite itself, all the power monitoring terminals using this GPS satellite are affected. Also time synchronization is impossible in an area where the radio waves from the GPS satellite cannot be received (e.g. an underground transformer station). There is also an economic issue where a signal cable must be laid from the GPS receiver (GPS receive antenna) 17 to the power monitoring terminal 1. According to the present embodiment, however, the above problems when a GPS is used are solved by using the atomic clock 18, based on cesium and rubidium standards, for example, that has similar time accuracy as the GPS, as the time synchronization, and a highly economic and highly reliable system can be provided.

Sixth Embodiment

Configuration

Figure 17:
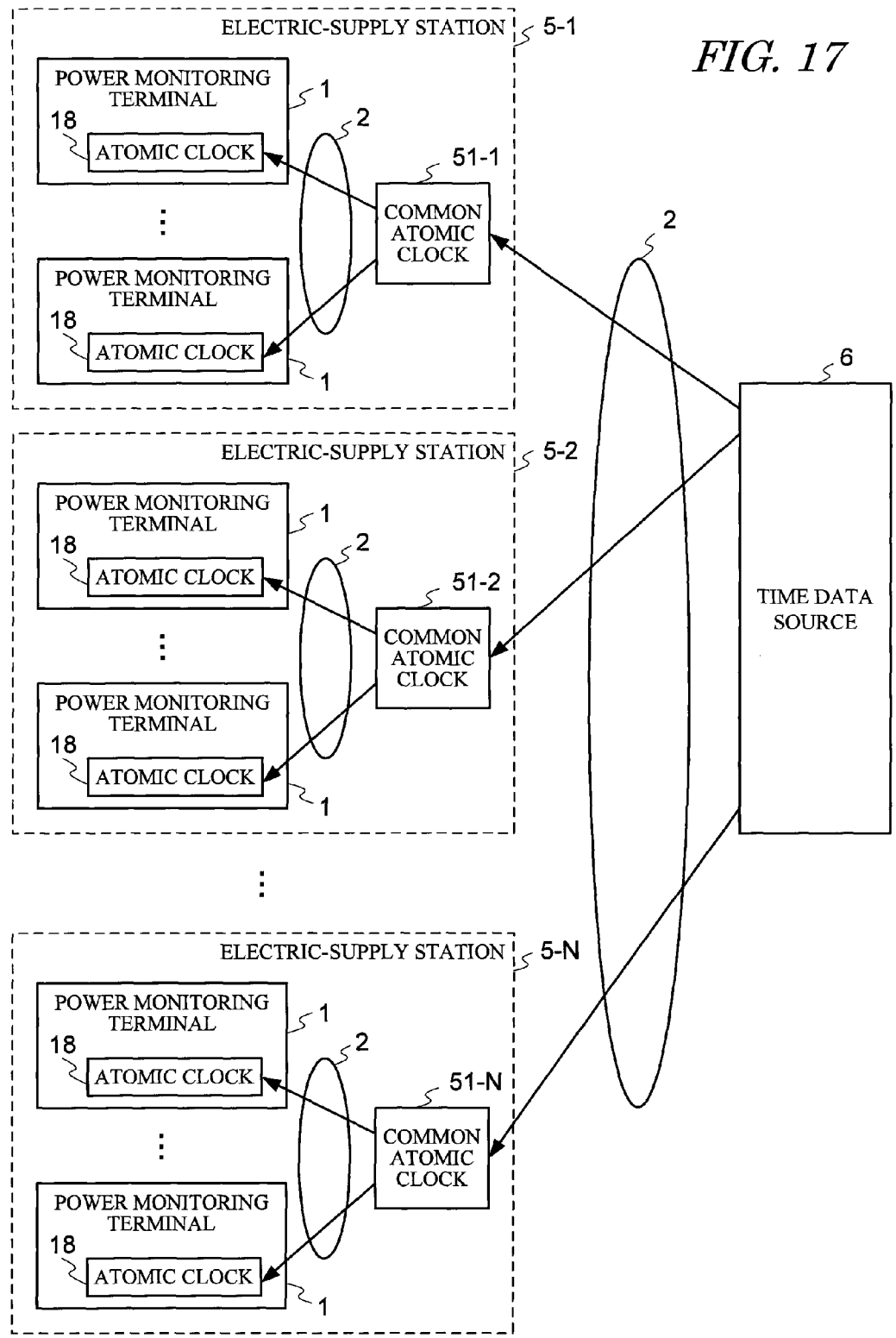
FIG. 17 is a diagram depicting a configuration example for time synchronization according to a sixth embodiment to which the present invention is applied.

FIG. 17 is a diagram depicting a configuration example for clock synchronization according to the sixth embodiment to which the present invention is applied. As FIG. 17 shows, in the present embodiment, a common atomic clock 51-1 to 51-N (N is an arbitrary integer in $2 \leq N$) is installed respectively in a plurality of electric-supply stations (power station/transformer station) 5-1 to 5-N within a target range, in order to correct the time of an atomic clock 18 of each power monitoring terminal 1. These common atomic clocks 51-1 to 51-N are connected to a time data source 6 via a communication network 2. For this time data source 6, an atomic clock installed in a head office, branch office or control station of a power company, for example, can be used.

[Actions]

In the plurality of electric-supply stations 5-1 to 5-N, time is commonly distributed from the time data source 6 via the communication network 2, and thereby the time of the common atomic clock 51-1 to 51-N of each electric-supply station is adjusted. And the time of the atomic clock 18 of each power monitoring terminal 1, in the same electric-supply station 5, is adjusted using these common atomic clocks 51-1 to 51-N. In this case, the atomic clock 18 and the common atomic clock 51, and the common atomic clock 51 and the time data source 6 are both connected via the communication network 2, so here synchronization is necessary. This synchronization can be implemented by performing the transmission delay time measurement and correction operation using a ping-pong transmission, which is generally used for PCM (Pulse Code Modulation) current differential relay. Ping-pong transmission is a system to implement bidirectional transmission by alternately transmitting signals in opposite directions, and may also be called a "time division direction control transmission system".

[Effects]

According to the above-mentioned wide area protection control measurement system of the sixth embodiment, the following effects are implemented in addition to the effect of the fifth embodiment.

Even if an atomic clock is used for the power monitoring terminal 1, a time lag may occur over a lengthy working. In this case, times among the plurality of power monitoring terminal 1 deviate, so an error of the applied arithmetic operation, shown in the above expressions (2) and (3), increases, and as a result, the accuracy of the protective control deteriorates. Whereas according to the present embodiment, the common atomic clock 51 is installed in each electric-supply station 5, and the time of the atomic clock 18 of each electric monitoring terminal in the same electric-supply station 5 is adjusted by the time of this common atomic clock 51, thereby the times of all the atomic clocks 18 in the electric-supply station 5 are matched. The plurality of electric-supply stations 5 can also adjusted the respective time by the common time data source 6, so all the power monitoring terminal 1 in all the electric-supply stations 5 can be synchronized accurately.

[Modifications]

As modifications of the above-mentioned sixth embodiment, the following modifications, for example, are possible.

In the sixth embodiment, a case of using the atomic clock for the time data source 6 was described, but GPS may be used for the time data source 6. Instead of installing an individual common atomic clock 51 in each electric-supply station 5, each power monitoring terminal 1 and a single time data source 6 may be directly connected via the communication network 2, so that the time of the atomic clock 18 of each power monitoring terminal 1 is set directly by the time data source 6.

Other Embodiments

The present invention is not limited to the above embodiments, and can be modified in various ways within the scope of the present invention. In other words, the system configuration and hardware configuration shown in the drawings are merely examples, and a concrete system configuration hardware configuration and software configuration can be appropriately selected. The electric quantity data and frame configuration for various requests shown in the drawings are also merely examples, and a concrete frame configuration can be appropriately changed.

What is claimed is:

1. A wide area protection control measurement system for performing protection, control and measurement of an electric power system within a target range, comprising:
    a plurality of power monitoring terminals installed in an electric-supply station in the target range;
    one or more electric quantity aggregation devices which are connected to the power monitoring terminals via a communication network; and
    one or more applied arithmetic operation devices which are connected with the electric quantity aggregation devices via inter-device connection, wherein:
    each power monitoring terminal constituting the plurality of power monitoring terminals has a data generation means for generating electric quantity data which indicates information on electric quantity by acquiring the electric quantity of the electric power system, and a data transmission means for transmitting the generated electric quantity data via a communication network;
    each electric quantity aggregation device constituting the one or more electric quantity aggregation devices has a data transmission means for receiving electric quantity data which is transmitted from the one or more power monitoring terminals via the communication network, a data aggregation means for aggregating the received electric quantity data and generating aggregated electric quantity data, and one or more interfaces for inter-device connection to output the generated aggregated electric quantity data; and
    each applied arithmetic operation device constituting the above-mentioned one or more applied arithmetic operation devices has an interface for inter-device connection to acquire the aggregated electric quantity data which is outputted from the electric quantity aggregation device, and applied arithmetic operation means for performing applied arithmetic operation for protection, control or measurement using the acquired aggregated electric quantity data.

2. A wide area protection control measurement system according to claim 1, wherein electric quantity data transmitted from each power monitoring terminal includes as a type of electric quantity information, bus voltage and power transmission line current which are represented in a representation format of synchro-phasor quantity or instantaneous value.

3. A wide area protection control measurement system according to claim 1, wherein electric quantity data transmitted from each power monitoring terminal includes as a type of subsidiary information, one or more types selected from the group of make and break information of switchgear, operation and recovery information of protective relays, and ON/OFF information of other power equipment.

4. A wide area protection control measurement system according to claim 1, wherein each power monitoring terminal has a means for selecting any one of synchro-phasor quantity and instantaneous value, as a representation format applied to electric quantity data to be transmitted.

5. A wide area protection control measurement system according to claim 1, wherein:
    each power monitoring terminal is adapted for transmitting the analog filter characteristics of the power monitoring terminal itself to the electric quantity aggregation device in the form of a function when an instantaneous value is used for the data to be transmitted; and
    each electric quantity aggregation device has a means for converting the transient response characteristic of each power monitoring terminal using a function when the function has been transmitted from each power monitoring terminal and received by the data transmission means of the electric quantity aggregation device, so that the transient response characteristic of respective power monitoring terminals become equivalent in the arithmetic operation in each applied arithmetic operation device.

6. A wide area protection control measurement system according to claim 1, wherein:
    each applied arithmetic operation device has a required information request means for requesting the information type and transmission cycle, which are required for the applied arithmetic operation, to the electric quantity aggregation device;
    each electric quantity aggregation device has a data transmission request means for comparing and organizing the information type and transmission cycle included in a plurality of requests from a plurality of applied arithmetic operation devices, and determining the information type and transmission cycle to satisfy each request, and requesting data transmission based on the determined information type and transmission cycle to the power monitoring terminal; and
    each power monitoring terminal has an information type selection means for selecting an information type according to the request from the electric quantity aggregation device and a transmission cycle adjustment means for adjusting the transmission cycle of the electric quantity data by the data transmission means according to the request, and is adapted for generating the electric quantity data which includes the information type selected by the information type selection means, using the data generation means, and transmitting the generated electric quantity data using the data transmission means at a transmission cycle adjusted by the transmission cycle adjustment means.

7. A wide area protection control measurement system according to claim 1, wherein:
each electric quantity aggregation device has a decision result notification means for notifying the information type and transmission cycle determined by the data transmission request means to each applied arithmetic operation device at the request source as the decision result; and
each applied arithmetic operation device has an operation algorithm change means for changing the applied arithmetic operation algorithm based on the information type and transmission cycle notified by the electric quantity aggregation device.

8. A wide area protection control measurement system according to claim 1, wherein:
each electric quantity aggregation device has a transmission quality measurement means for measuring the transmission quality between each power monitoring terminal at the transmission source and the electric quantity aggregation device itself based on the electric quantity data received by the data transmission means and a transmission cycle decision means for determining the transmission cycle of the electric quantity data from the power monitoring terminal based on the measured transmission quality and transmission cycle change condition which is set in advance, and requesting the adjustment to the decided transmission cycle to the power monitoring terminal; and
each power monitoring terminal has a transmission cycle adjustment means for adjusting the transmission cycle of the electric quantity data by the data transmission means according to the request from the electric quantity aggregation device, and is adapted for transmitting the electric quantity data generated by the data generation means through the data transmission means, at the transmission cycle adjusted by the transmission cycle adjustment means.

9. A wide area protection control measurement system according to claim 1, wherein each power monitoring terminal has an atomic clock, and is adapted for generating electric quantity data with time by the data generation means using time of the atomic clock.

10. A wide area protection control measurement system according to claim 1, wherein a common atomic clock for correcting the time of an atomic clock of the power monitoring terminal is installed respectively in the electric-supply stations within the target range, and the common atomic clock is adapted for adjusting the time using time data which is commonly distributed from one time data source via the communication network.

11. A wide area protection control measurement system according to claim 1, wherein:
a plurality of electric quantity aggregation devices are installed in the target range; and
each of the plurality of power monitoring terminals is assigned to any one of the plurality of the electric quantity aggregation devices, and is adapted for transmitting electric quantity data to the electric quantity aggregation device to which the terminal is assigned.

12. A wide area protection control measurement system according to claim 1, wherein:
two series of electric quantity aggregation devices are installed in the target range; and
each of the plurality of power monitoring terminals is adapted for transmitting electric quantity data to both of the two series of electric quantity aggregation devices.

13. A wide area protection control measurement method for performing protection, control and measurement of an electric power system within a target range, the method using:
a plurality of power monitoring terminals installed in an electric-supply station in the target range;
one or more electric quantity aggregation devices which are connected to the power monitoring terminals via a communication network; and
one or more applied arithmetic operation devices which are connected with the electric quantity aggregation devices via inter-device connection, and
the method comprising the steps of:
by means of each power monitoring terminal, generating electric quantity data which indicates information on electric quantity by acquiring the electric quantity of the electric power system, and transmitting the generated electric quantity data via a communication network;
by means of each electric quantity aggregation device, receiving electric quantity data which is transmitted from the one or more power monitoring terminals via the communication network, aggregating the received electric quantity data and generating aggregated electric quantity data, and outputting the generated aggregated electric quantity data; and
by means of each applied arithmetic operation device, acquiring the aggregated electric quantity data which is outputted from the electric quantity aggregation device, and performing applied arithmetic operation for protection, control or measurement using the acquired aggregated electric quantity data.

* * * * *